US007257561B1

(12) United States Patent
Abe

(10) Patent No.: US 7,257,561 B1
(45) Date of Patent: *Aug. 14, 2007

(54) CONTINUOUS PRICE OPTIMIZATION SYSTEM, METHOD AND COMPUTER PROGRAM PRODUCT FOR SATISFYING CERTAIN BUSINESS OBJECTIVES

(76) Inventor: John R. Abe, 1755 Frobisher Way, San Jose, CA (US) 95124

(*) Notice: Subject to any disclaimer, the term of this patent is extended or adjusted under 35 U.S.C. 154(b) by 0 days.

This patent is subject to a terminal disclaimer.

(21) Appl. No.: 10/644,944

(22) Filed: Aug. 19, 2003

(51) Int. Cl.
*G06F 17/00* (2006.01)
(52) U.S. Cl. ..................................................... 705/400
(58) Field of Classification Search .................... 705/1, 705/10, 400, 7, 26
See application file for complete search history.

(56) References Cited

U.S. PATENT DOCUMENTS

| | | | |
|---|---|---|---|
| 5,377,095 A | 12/1994 | Maeda et al. ................ | 364/401 |
| 5,459,656 A | 10/1995 | Fields et al. ................ | 364/401 |
| 5,615,109 A | 3/1997 | Eder ........................... | 395/208 |
| 5,822,736 A | 10/1998 | Hartman et al. ............... | 705/1 |
| 5,873,069 A * | 2/1999 | Reuhl et al. .................. | 705/20 |
| 5,878,400 A | 3/1999 | Carter, III .................... | 705/20 |
| 5,918,209 A | 6/1999 | Campbell et al. .............. | 705/5 |
| 5,987,425 A | 11/1999 | Hartman et al. .............. | 705/20 |
| 6,029,139 A | 2/2000 | Cunningham et al. ........ | 705/10 |
| 6,078,893 A | 6/2000 | Ouimet et al. ................ | 705/10 |
| 6,094,641 A | 7/2000 | Ouimet et al. ................ | 705/10 |
| 6,308,162 B1 | 10/2001 | Ouimet et al. ................. | 705/7 |
| 6,553,352 B2 * | 4/2003 | Delurgio et al. ............ | 705/400 |
| 7,043,449 B1 * | 5/2006 | Li et al. .................... | 705/36 R |
| 2002/0116348 A1* | 8/2002 | Phillips et al. .............. | 705/400 |
| 2003/0217016 A1* | 11/2003 | Pericle ....................... | 705/400 |

FOREIGN PATENT DOCUMENTS

WO    WO 00/52605 A1 *    9/2000

OTHER PUBLICATIONS

Unknown Author, The Dynamic Pricing Revolution, Aug. 2000, 18 pages.*
Office Action Summary from U.S. Appl. No. 10/652,640 which was mailed on Nov. 3, 2004.
Office Action Summary from U.S. Appl. No. 10/652,640 which was mailed on Jan. 26, 2005.
Office Action Summary from U.S. Appl. No. 10/644,949 which was mailed on Nov. 18, 2004.
Office Action Summary from U.S. Appl. No. 10/644,949 which was mailed on Jun. 7, 2005.

* cited by examiner

*Primary Examiner*—Thomas A. Dixon
(74) *Attorney, Agent, or Firm*—Zilka-Kotab, PC

(57) ABSTRACT

A computer-implemented method, system and computer program product are provided for utilizing feedback in generating an optimal price. In use, an optimal price is generated. Next, a result of utilizing the optimal price is identified. A reaction may then be carried out based on the result.

34 Claims, 34 Drawing Sheets

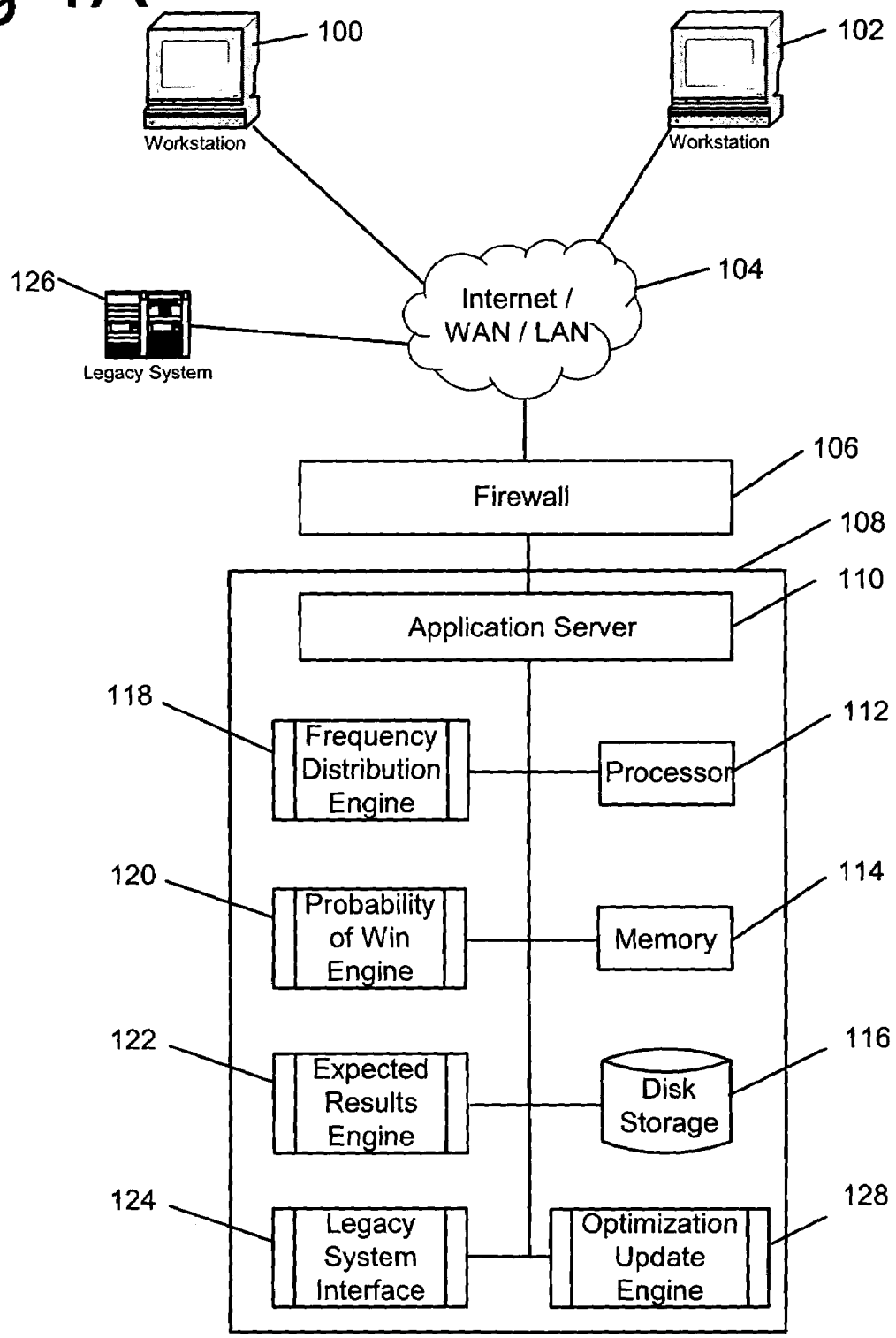

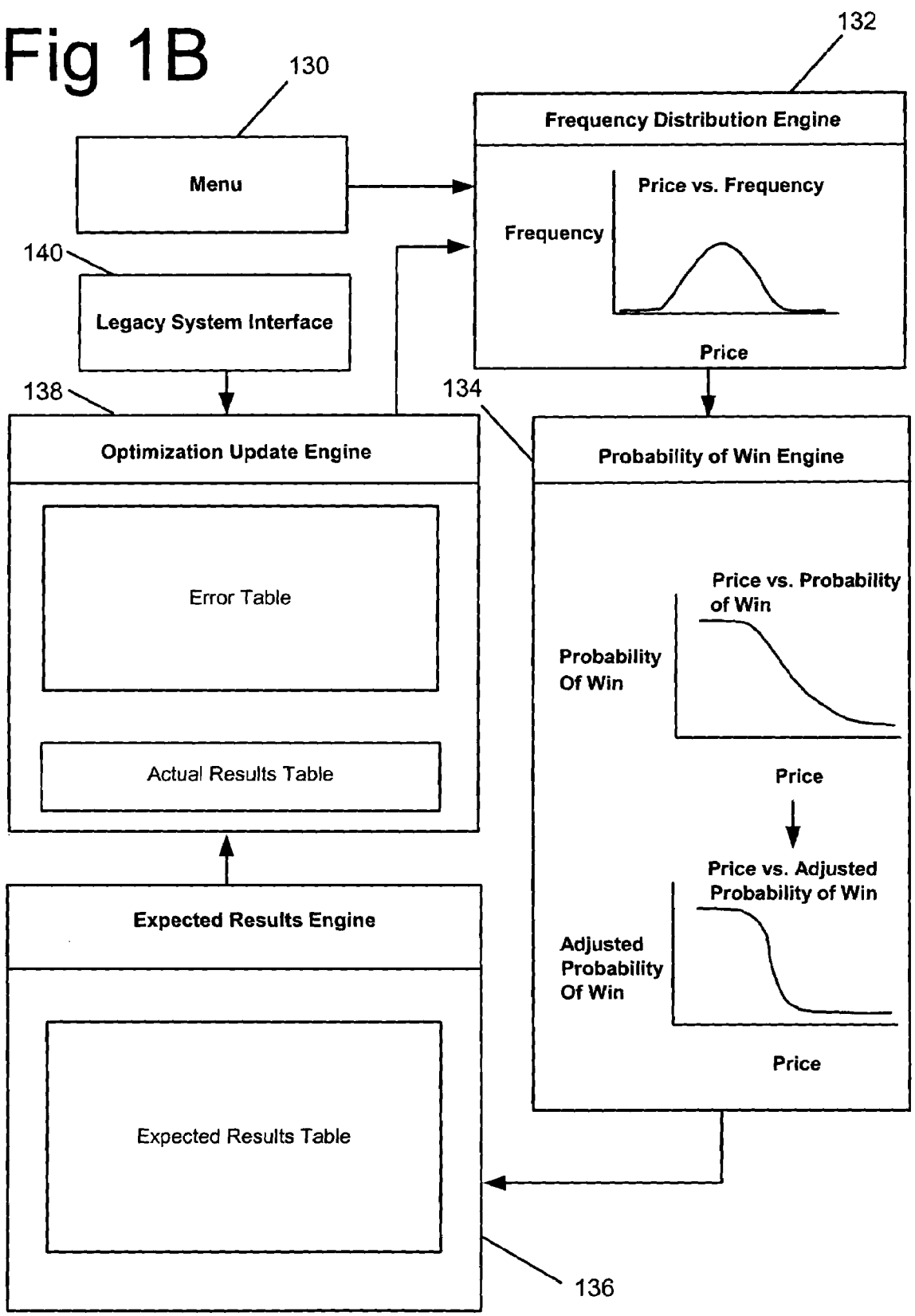

From Fig 20
Reference: 2010

From Fig 25
Reference: 2508

CONTINUOUS PRICE OPTIMIZATION SYSTEM, METHOD AND COMPUTER PROGRAM PRODUCT FOR SATISFYING CERTAIN BUSINESS OBJECTIVES

FIELD OF THE INVENTION

The present invention relates to computer-implemented system that continuously optimizes the price for a supplier so as to meet certain business objectives.

BACKGROUND OF THE INVENTION

A supplier who competes in a market with one or more competitors is faced with the challenge of continuously pricing their goods and services. If a supplier understands the market's responsiveness to price as well as the supplier's cost, a supplier can determine the optimal price that ensures meeting one or more of the following business objectives; a) Maximizing revenue, b) Maximizing Gross Profit, c) Maximizing Earnings Before Income Tax, d) Market share, e) Factory utilization, and more. Ideally, the supplier's understanding of the market will continuously update itself to reflect competitor's changes in pricing as well as shifts in supply and demand.

Prior art has limitations that not only prevent a supplier from making an initial useable estimate of the optimal price, but also from making an accurate update of the optimal price. The limitations stem from inaccuracies and potentially incorrect assumptions associated with the demand or yield curve, which depicts the relationship between quantity and price. These inaccuracies are the result of one or more of the following problems; a) Limited span in sales order data in which to build the demand curve, b) Lack of statistically relevant sales order data, c) Lack of market relevant sales order data, d) Implicit assumption that the historical and future sales environments remain the same, e) Lack of a rapid method for assessing whether a new optimized price is required as a result of a shift in market demand or pricing, f) Lack of a method of rapidly updating the optimized price calculation.

The demand curve is typically constructed using the supplier's historical sales order data, which limits the extent and completeness of the demand curve. For example, if the supplier behaves as the "low price leader", the sales order data can only be used to create a demand curve reflecting how the market responds to low pricing.

The demand curve should depict the market's responsiveness to all pricing scenarios, not just those scenarios previously employed by the company. As a result of using a demand curve constructed using a limited span of sale order data, it is not likely that the optimum price can be determined.

Another challenge in constructing the demand curve is the lack of statistically relevant data. Frequently, there are pieces of sales data which conflict. An example is that one customer was willing to pay $2.23 each for 10,000 units. Another customer, in the identical customer group may demand 11,500 units for $2.23 each, a 15% difference in quantity. This situation is not unusual, especially for opaque markets where one buyer does not see what other buyers are paying and therefore facilitates a supplier charging different unit prices for the same goods or services. The prior art attempts to resolve this situation through averaging algorithms and requires sufficient sale order data for statistical relevance. The challenge is that there is seldom-sufficient data to build a statistically relevant demand curve.

Yet another challenge with the prior art is that even if the demand curve is statistically relevant, it is not market relevant. Statistical relevance can be assured through a large enough set of sales orders. However, collecting a large set of sales orders may necessitate waiting long periods of time to allow a sufficient number of orders to be accumulated for statistical relevance. During the long collection period, the market may have changed considerably in its responsiveness to pricing. So while the demand curve may have statistical relevance, it is meaningless because it is based on data too old for market relevance. As a consequence, determining an optimum price based on a dated demand curve is unlikely.

In the prior art, there is an implicit assumption that the historical sales and future sales environment are identical. For example, if the derived demand curve indicates that 10,000 units were sold when the price was $3.25, the expectation going forward is that the supplier will again sell 10,000 units at $3.25. The implicit assumption is that the overall economic environment, the supplier's approach to marketing, and selling methodology has remained the same. Rarely do the economic environment, the supplier's marketing, and selling methodologies remain intact for any length of time. As a consequence, the validity of the demand curve is questionable and its usefulness in doubt.

Without a representative demand curve, it is impossible to determine an optimum price that ensure meeting one or more of the following business objectives; a) Maximizing revenue, b) Maximizing Gross Profit, c) Maximizing Earnings Before Income Tax, d) Market share, e) Factory utilization, etc.

Even if prior art could overcome the aforementioned issues associated with the span of sales order data, statistical relevance, market relevance, and the accommodate changes in selling methodologies, prior art still must overcome the final issue of rapidly determining when market shifts in pricing and demand necessitate updating the demand curve. Without a method for rapidly determining when the demand curve is no longer representative of the market's responsiveness to price, a supplier will continue under the presumption that the current price is optimal when the market shifts have necessitated that a new optimal price is needed.

In accuracies and poor assumptions aside, once a demand curve is created, the supplier can make a determination of how to price their goods and services in order to satisfy certain business objectives. With an understanding of the relationship between quantity and price, an income statement, as well as additional metrics, can be constructed for each price through the following steps; a) Calculation of revenue by multiplying the price and quantity, b) Determination of the cost-of-goods by multiply the quantity and unit cost at that quantity, c) Calculation of gross profit by subtracting the cost-of-goods from the revenue, d) Determining the sales and general administration costs, e) Calculating the earnings before income tax by subtracting the sales and general administration costs from the gross profit, f) Calculation of market share by dividing the quantity by the total quantity sold by all suppliers, and e) Calculating factor utilization by dividing the units sold by the capacity of the factory for that product.

Once the income statement and additional metrics are calculated for each price, the optimum price can be selected to satisfy various business objects. For example, the supplier may wish to optimize pricing to maximize revenue. To identify the optimum price that maximizes revenue, the income statements are searched to identify where the revenue is maximized and the associated price extracted.

In addition to optimizations with one objective in mind, optimizations are possible that maximize the multiple business objectives. For example, the supplier may wish to optimize pricing to maximize revenue and gross profit. In this example, the income statements are searched for the price at which revenue is maximized and the price at which gross profit is maximized. The supplier then selects a price between the maximum gross profit and revenue price that represents the best tradeoff between these two business objectives.

DISCLOSURE OF THE INVENTION

A computer-implemented method, system and computer program product are provided for utilizing feedback in generating an optimal price. In use, an optimal price is generated. Next, a result of utilizing the optimal price is identified. A reaction may then be carried out based on the result.

BRIEF DESCRIPTION OF THE DRAWINGS

FIG. 1A is a diagram of a general-purpose computer system with principal elements used in one embodiment.

FIG. 1B is a diagram of the processing flow between the major processing components.

DESCRIPTION OF THE PREFERRED EMBODIMENTS

Figure 2:
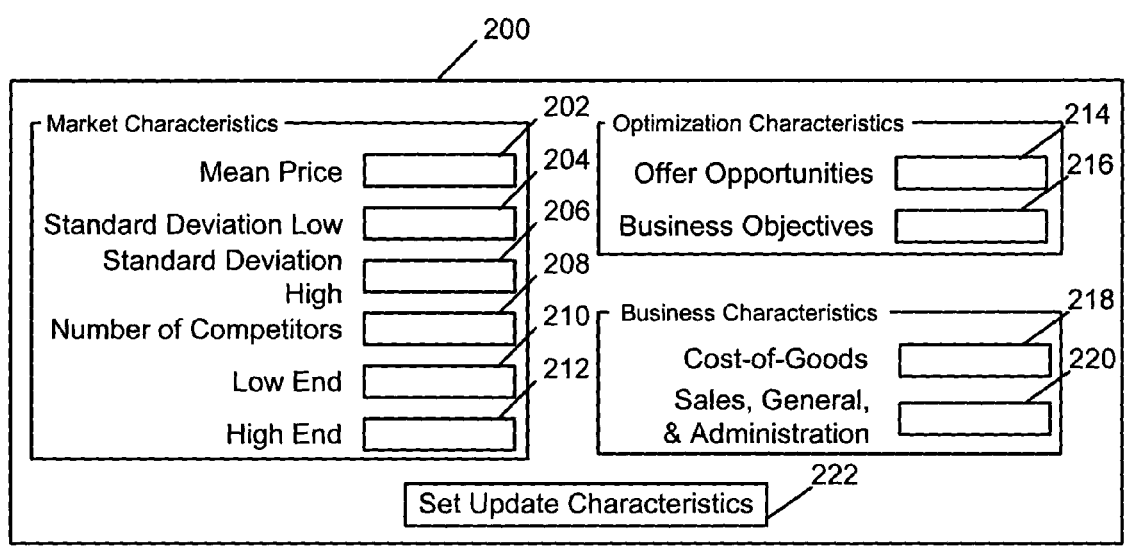
FIG. 2 is an input menu on the display device.

The following description is present to enable one of ordinary skill in the art to make and use the present embodiment and is provided in the context of a patent application and its requirements. Various modifications to the illustrated embodiment will be readily apparent to those skilled in the art and the generic principles herein may be applied to other embodiments. Thus, the present embodiment is not intended to be limited to the embodiment shown but is to be accorded the widest scope consistent with the principles and features described herein.

As shown in FIG. 1, a system includes one input/display device 100 or multiple input/display devices 102 such as a computer workstation that a user enters commands, inputs data, and views computed results; one or more legacy software applications 126 that are used to issue prices, record quotes, and sales orders; a connection to the Internet/WAN/LAN 104 that uses TCIP protocol; a firewall 106; a server or other such computing device 108 consisting of an application server 110, a processor 112, random access memory 114, and disk storage 116.

The memory 114 and disk 116 store a Frequency Distribution Engine 118 that calculates the number of offers for the subject goods and services that the user believes competitors are offering in a particular market. In addition the memory 114 and disk 116 store the Probability of Win Engine 120, which calculates the probability that the user will receive a sale when the subject goods and services are priced at a specific value, and a Expected Results Engine 122 that calculates the anticipate revenue and gross profit for each price. The Legacy System Interface translates sales order and Offer Opportunity data from the Legacy System(s) 126 to a useable format for the subject application. It will be understood that the described embodiments are embodied as computer instructions stored in memory 114 and executed by processor 112. These instructions can also be stored on a computer readable media such as a floppy disk, CD ROM, etc. and can also be transmitted via a network such as the internet, an intranet, etc., via a carrier wave embodying the instructions.

FIG. 1B shows the Menu 130, major processing engines, Frequency Distribution Engine 132, Probability of Win Engine 134, Expected Results Engine 136, Optimization Update Engine 138, and the Legacy System Interface 140. The Frequency Distribution Engine 132, computes and stores a frequency distribution of prices in a table based received by Menu 130. The Probability of Win Engine 134, computes and stores the probability of a customer purchasing the subject good or service in a table based on the frequency distribution of prices. The Probability of Win Engine 134, adjusts and then stores the probability of a customer purchase based on the number of competitors received by the Menu 130. Using the adjusted probability of a customer purchase and values received by Menu 130, the Expected Results Engine 136 calculates the units sold, income, cost of goods, gross profit, sales general & administrative expense, and earnings before income tax for each price and mean price and stores the result in a table. The table created by the Expected Results Engine 136 is searched for the optimum price that optimizes the business objective designated by Menu 130. The Legacy System Interface 140 provides an interface to the user's enterprise resource planning system as well as other legacy systems. Through the Legacy System Interface, values for the Offer Opportunities and Sales Orders are transferred to the Optimization system 108. The Optimization Update Engine 138, based on the number of Offer Opportunities, percentage difference between the expected and actual wins, determines if a new optimization is required. If an optimization is required, then the actual win rate and the current value for optimized price is used to search an Error Table contained in the Optimization Update Engine 140 for a new Mean Price value that is used to update the Frequency Distribution Engine 132.

As shown in FIG. 2, a user who wishes to meet a certain business objective, such as maximizing revenue or maximizing gross profit for a specific good or services is shown a menu 200 on an input/display device. The user enters in parameters that describe the frequency distribution of the number of offers verses price in a designated market as well as the number of competitors. The user enters in an estimated mean price into the Mean Price Field 202, the standard deviation low into the Standard Deviation Low Field 204, the standard deviation high into the Standard Deviation High Field 206, the number of competitors in the Number of Competitors Field 208, the beginning of the frequency distribution on curve in the Low End Field 210, and the end of the frequency distribution curve in the High End Field 212.

The use of a frequency distribution of pricing to estimate the market has distinct advantages over prior art. These advantages are summarized as follows:

a) Enables a broad and complete estimate of the market that that ensures the optimal price can be selected based on business objectives. While prior art can potentially optimize price for a given set of market data, typically that market data is extremely limited in scope.
b) Eliminates the lack of statistical significance problem of prior art.
c) Eliminates the potential of lack of market relevance associated with prior art.
d) Allows the accounting of micro-economic conditions such as oversupply verse demand, undersupply vs. demand, and supply equal to demand that may not be depicted in prior art.

The user continues the configuration of the system by entering the number of offer opportunities that is anticipated to occur in a given time period in the Offer Opportunities Field 214, the business objective in the Business Objective Field 216, the cost-per-unit in the Cost-of-Goods Field 218, and the SG&A costing in the Sales & General Administration Field 220.

On completing the entry on data into the menu 200, the user switches to the display of the Optimization Update Characteristics by activating the Set Update Characteristics Button 222.

Figure 3:
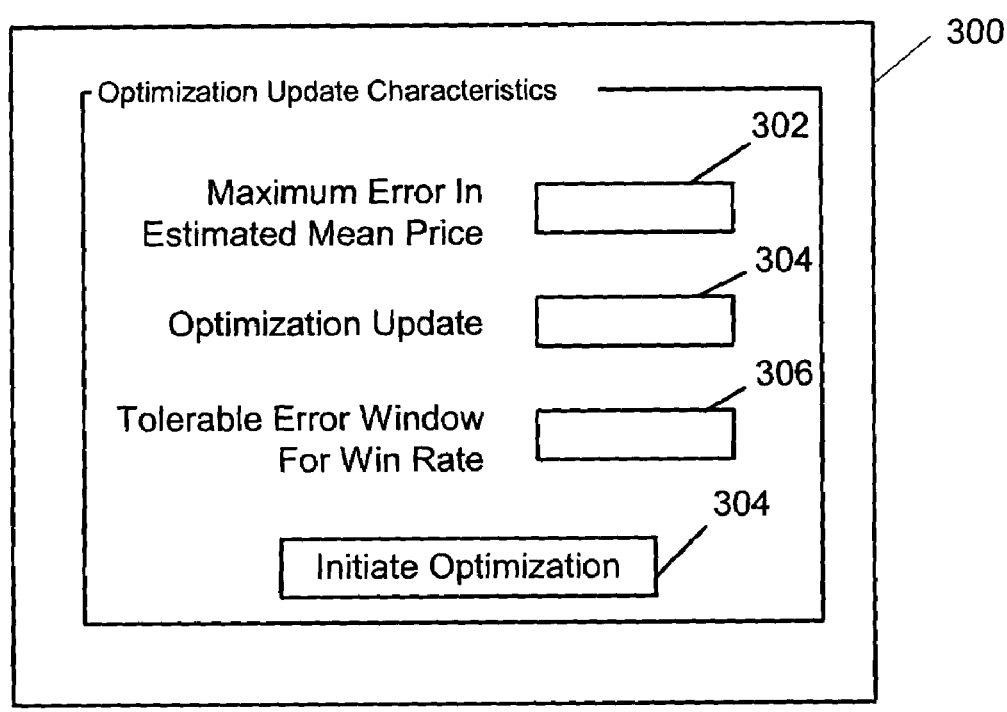
FIG. 3 is a second input menu on the display device.

FIG. 3 shows a menu 300 that solicits user input to configure the optimization update characteristics. The menu has fields for the Maximum Error In Estimating Mean Price 302; the frequency that the optimization should be repeated, Optimization Update 304; and the Tolerable Error Window for Win Rate 306. On completion of this menu, the user initiates the optimization by activating the Initiate Optimization Button 304.

Figure 4:
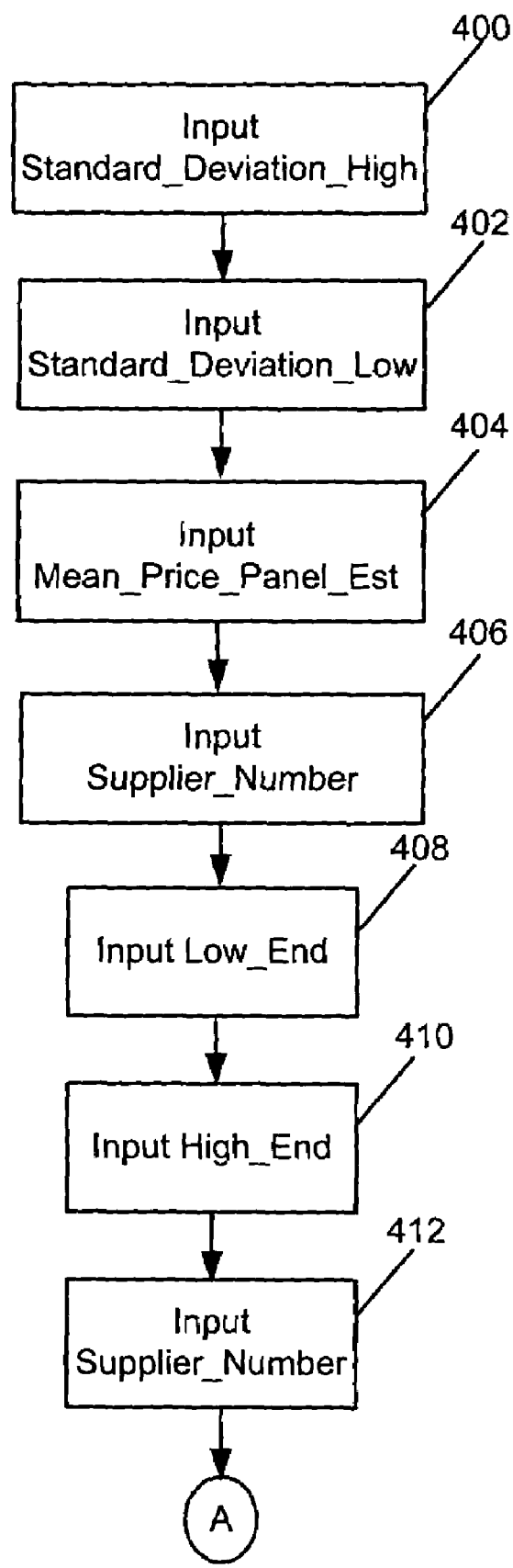
FIG. 4 is a flow chart illustrating the input of data.

FIG. 4 shows the flow chart describing the input of data into the routine that is initiated by activating the Initiate Optimization Button 304. Input and assignment of standard deviation high to variable Standard_Deviation_High 400 is accomplished in 400. Input and assignment of standard deviation low to variable Standard_Deviation_Low 402 is accomplished in 402. Input and assignment of mean price to variable Mean_Price_Panel_Estimate 404 is accomplished in 404. Input and assignment of Supplier_Number 406 is accomplished in 406. Input and assignment of low end to variable Low_End 408 is accomplished in 408. Input and assignment of high end to variable High_End 410 is accomplished in 410. Input and assignment of the number of competitors to variable Supplier_Number 412 is accomplished in 412.

Figure 5:
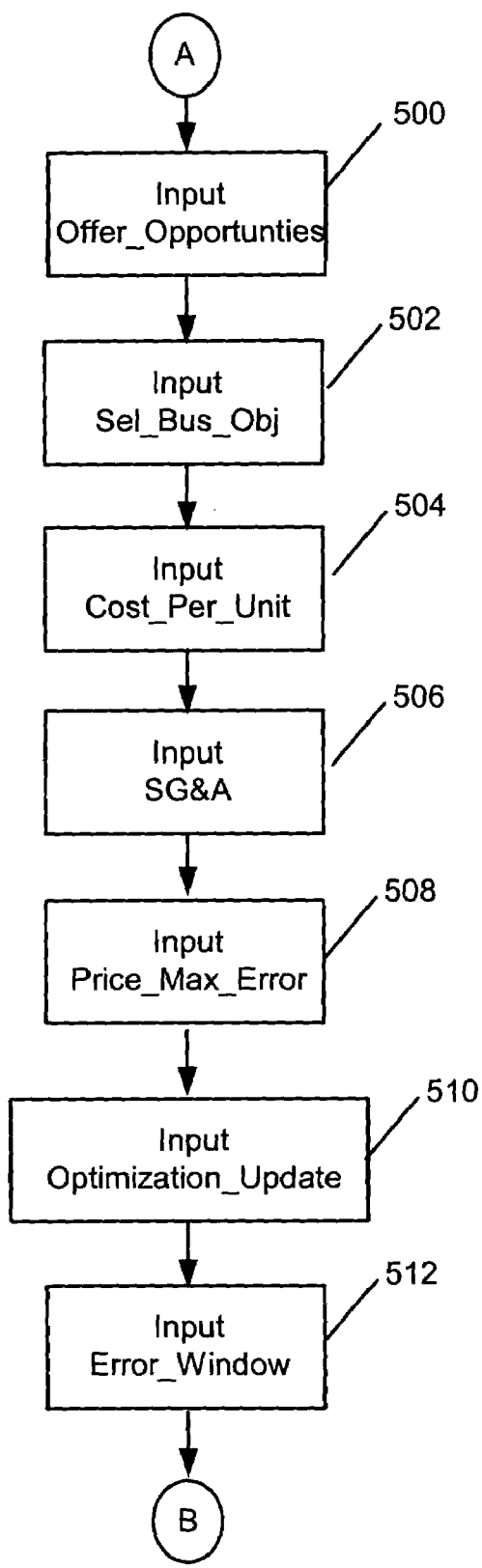
FIG. 5 is the second flow chart illustrating the input of data.

FIG. 5 shows the continuation of the flow diagram describing the input of data into the routine. Input and assignment of offer opportunities to variable Offer_Opportunities 500 is accomplished in 500. Input and assignment of the business objective to variable Sel_Bus_Obj 502 is accomplished in 502. Input and assignment of the cost-of-goods to variable Cost_Per_Unit 504 is accomplished in 504. Input and assignment of sales, general, and administration expenses to variable SG&A 506 is accomplished in 506. Input and assignment of the maximum error to the mean price estimate variable Price_Max_Error 508 is accomplished in 508. Input and assignment of the frequency of optimization update value to variable Optimization_Update 510 is accomplished in 510. Input and assignment of the Tolerable Error Window for Win Rate to variable Error_Window 512 is accomplished in 512.

Figure 6:
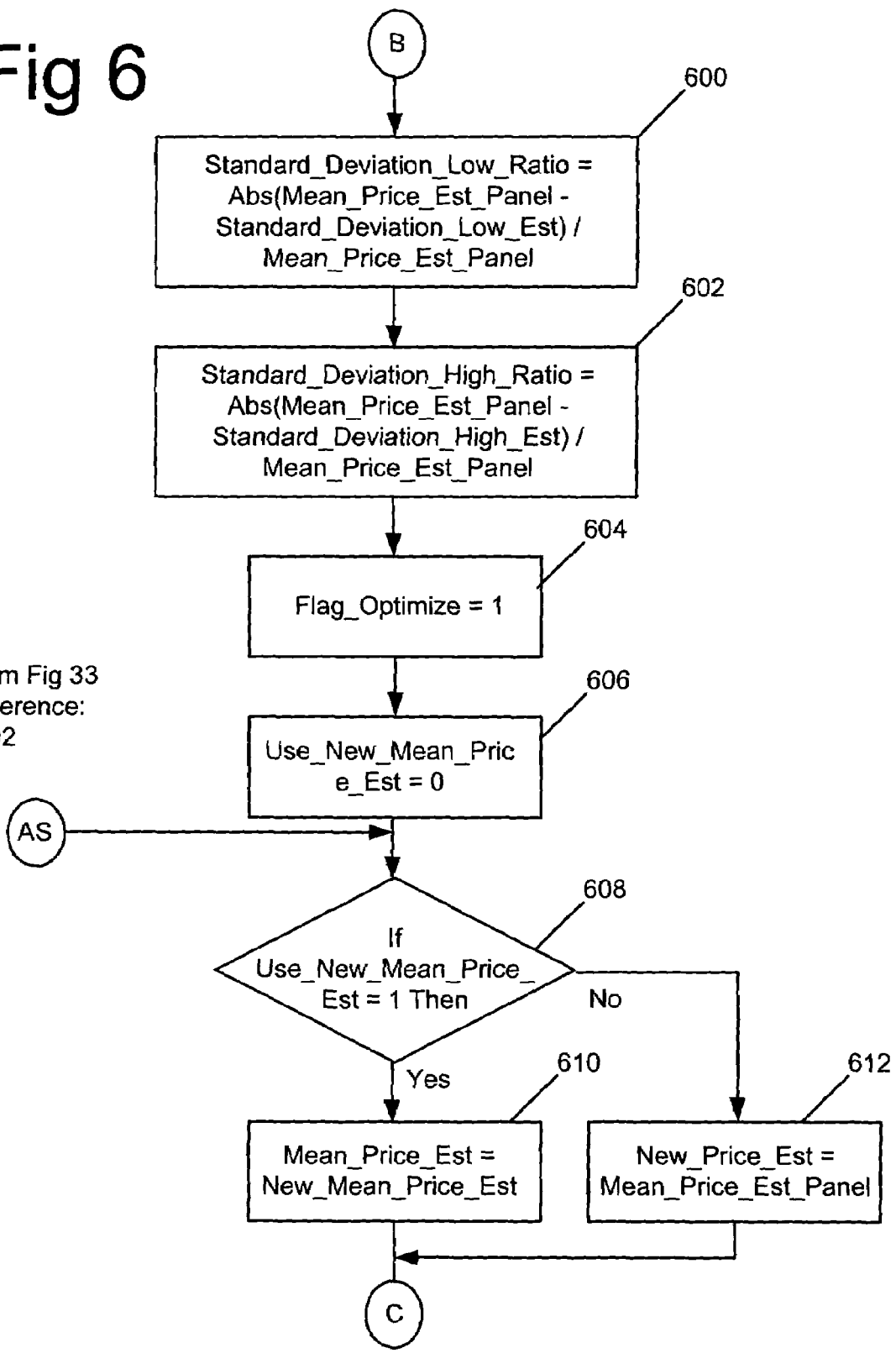
FIG. 6 is a flow chart illustrating the calculation of standard deviation ratios and assignment of the Mean Price Estimate.

FIG. 6 illustrates the calculation of the standard deviation ratios, beginning of the optimization loop, and the assignment of the mean price estimates. The standard deviation low ratio, the ratio of the lower standard deviation to the mean price, is calculated in 600 and assigned to variable Standard_Deviation_Low_Ratio 600. The standard deviation high ratio, the ratio of the upper standard deviation to the mean price, is calculated in 602 and assigned to variable Standard_Deviation_Low _Ratio 602. The flag, Flag_Optimization 604, that determines whether an optimization is conducted is set to 1 in 604. The flag, Use_New_Mean_Price 606, is set to zero in 606, which indicates the user's initial estimate of the mean price estimate should be used rather than the estimate derived by the application. The optimization loop, defined by steps 608 through 3302, begins with a program branch 608. The program branches in 608 based on the value of Use_New_Mean_Price 608. If Use_New_Mean_Price 608 has a value of one, then the program uses a New_Mean_Price_Price_Est 610 derived in subsequent steps. If Use_New_Price 608 does not have a value of one, then the value the user entered in FIG. 2, menu 200, field 202 is used.

Figure 7:
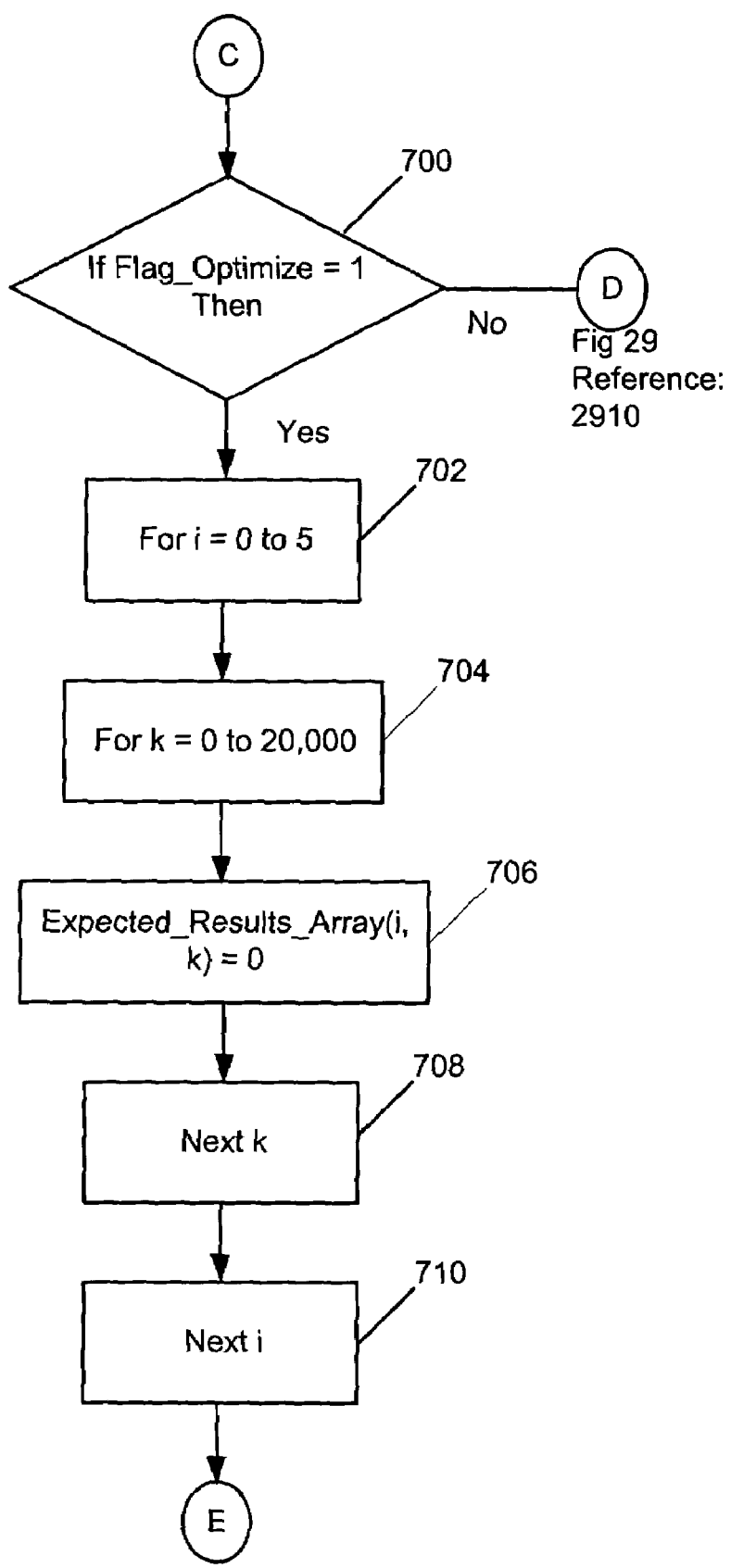
FIG. 7 is a flow chart illustrating the beginning of the optimization loop.

FIG. 7 illustrates the determination of whether the optimization will be conducted or delayed. If Flag_Optimization 700 is not equal to one, then the optimization is delayed and the next step is 2910. If Flag_Optimization 700 is one, then the two dimensional array of size 5 by 20,000 called Expected_Results_Array 706 is initialized to zero in a For-Next loop established by 702, 704, 706, 708, and 710. Expected_Results_Array 706 will store the expected win rate, revenue, and gross profit, for a given mean price estimate and price.

Figure 8:
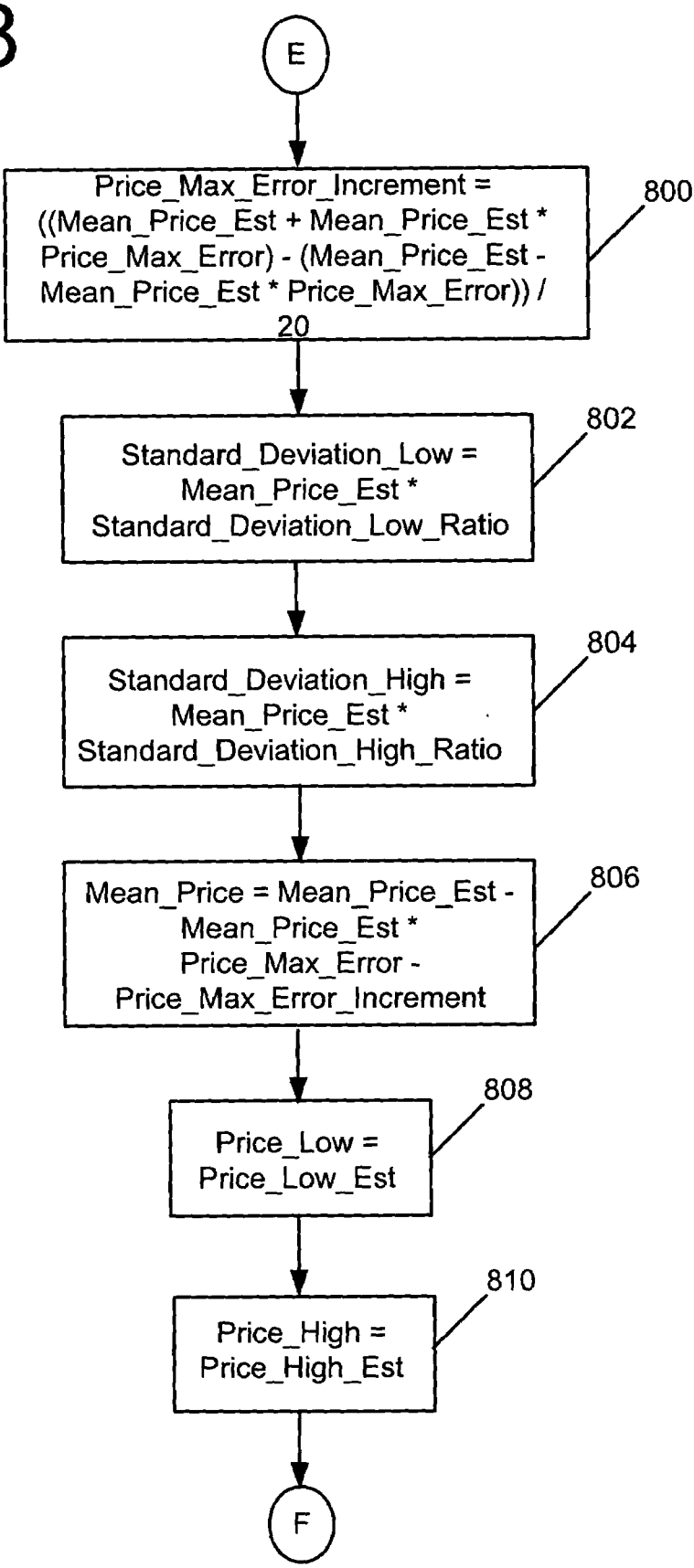
FIG. 8 is a flow chart illustrating the assignment of optimization variables.

FIG. 8 is illustrates the assignment of optimization variables. The size of the price increments between the lower and upper bounds of the range of Mean_Price_Est 800, as defined by the user's entry in FIG 2, field 202, is calculated in 800. The lower standard deviation is calculated and assigned to Standard_Deviation_Low 802. The upper standard deviation is calculated in and assigned to Standard_Deviation_High 804. The first Mean_Price is calculated in 806. The value for Price_Low_Est 808 is assigned to Price_Low 808. The value for Price_High_Est 810 is assigned Price_High 810.

Figure 9:
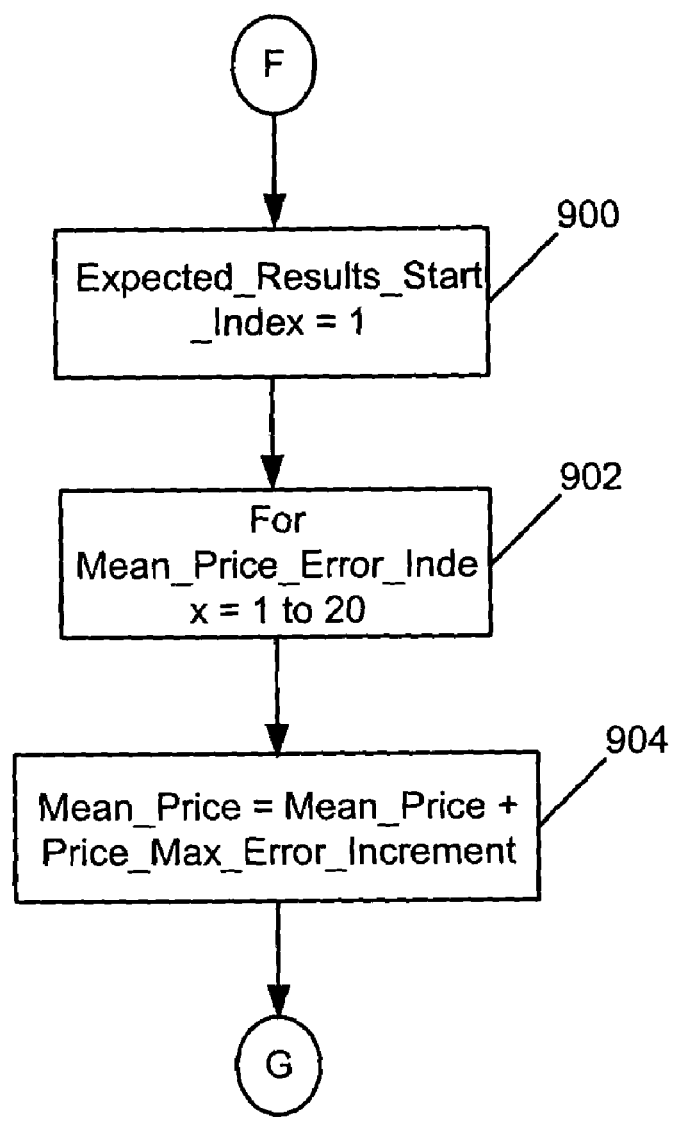
FIG. 9 is a flow chart illustrating the assignment of optimization variable and initiation of the Mean Price Error Index Loop.

FIG. 9 begins the flow diagram of the Frequency Distribution Engine 118 referenced in FIG. 1. The Frequency Distribution Engine 118 calculates an estimate of the distribution of market prices the menu 200 inputs describing the market. In the preferred embodiment of the Frequency Distribution Engine 118, the distribution is represented by a modified normal distribution such that the distribution to the left of the mean price is characterized by a normal distribution potentially having a standard deviation different than the distribution to the right of the mean. In this embodiment, the use of a modified normal distribution curve is computationally expedient. However alternative embodiments may employ other mathematical functions such as a Language Polynomial. Yet another alternative embodiment may simply be a manual determination of a distribution of points.

FIG. 9 illustrates the assignment of the optimization variables and the initiation of the Mean Price Error Loop defined by steps 902 through 1610. The value of Expected_Results_Start_Index 900 is set to one. The Mean Price Error Loop defined by steps 902 through 1610 is initiated by the For statement in 902. The value of mean price is calculated and assigned to Mean_Price 904, which is recalculated for every repetition of the Mean Price Error Loop defined by steps 902 through 1610.

Figure 10:
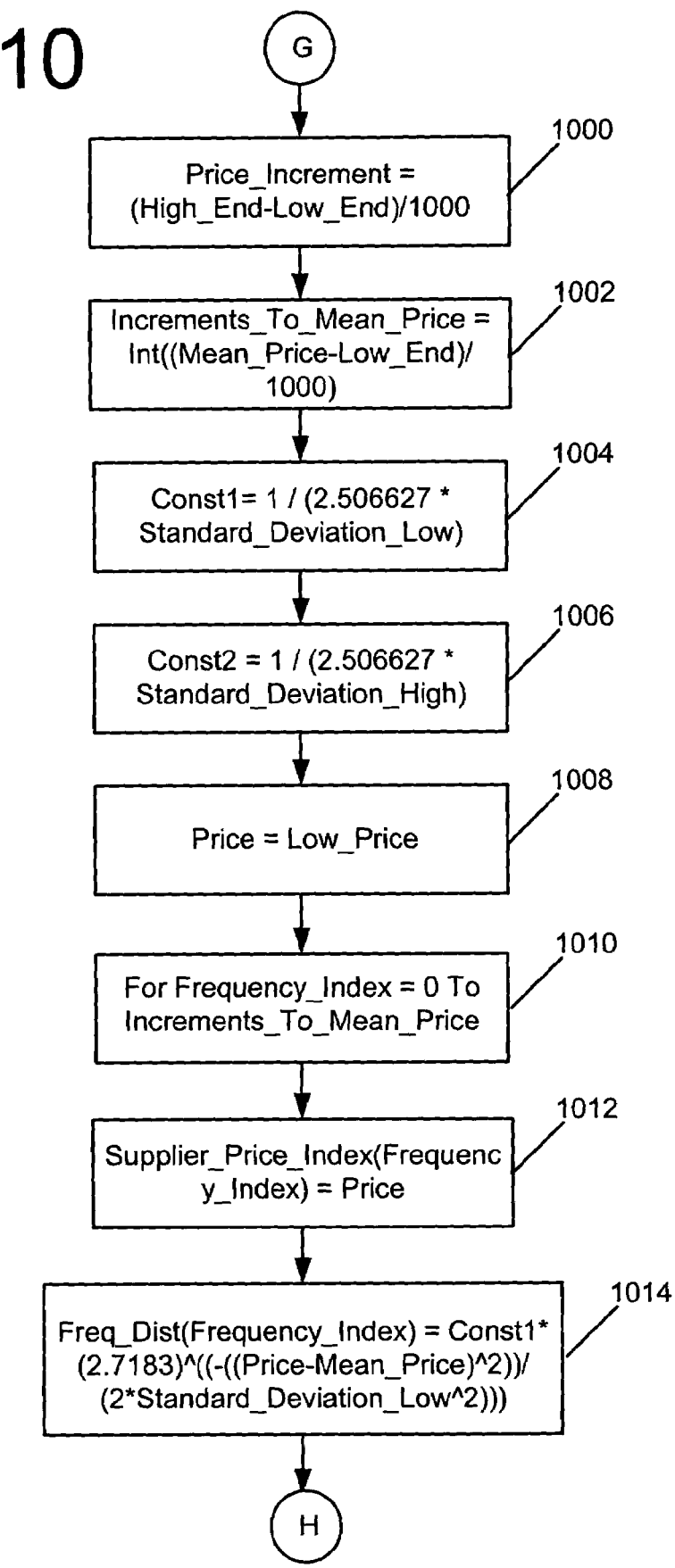
FIG. 10 is a flow chart illustrating the assignment of optimization variables and the calculation of the lower portion of the Frequency Distribution Array.

FIG. 10 illustrates the assignment of optimization variables and a continuation of the Mean Price Error Loop. FIG. 10 beings by determining the number of price increments represented by Price_Increment 1000 contained in the range of the frequency distribution, as well as the number of increments from the low end to the mean price represented by Increments_To_Mean_Price 1002. The values for variables Const1 1004 and Const2 1006 are calculated. The value of Price 1008 is initialized. A programming loop 1010 to 1102 is established that increments Frequency_Index 1010 in single steps to Increments_To_Mean_Price 1010. The value of variable Price 1008 is stored in Supplier_Price_Index 1012. The Frequency Distribution for the given variable Price 1008 is calculated and stored in an array called Freq_Dist 1014.

Figure 11:
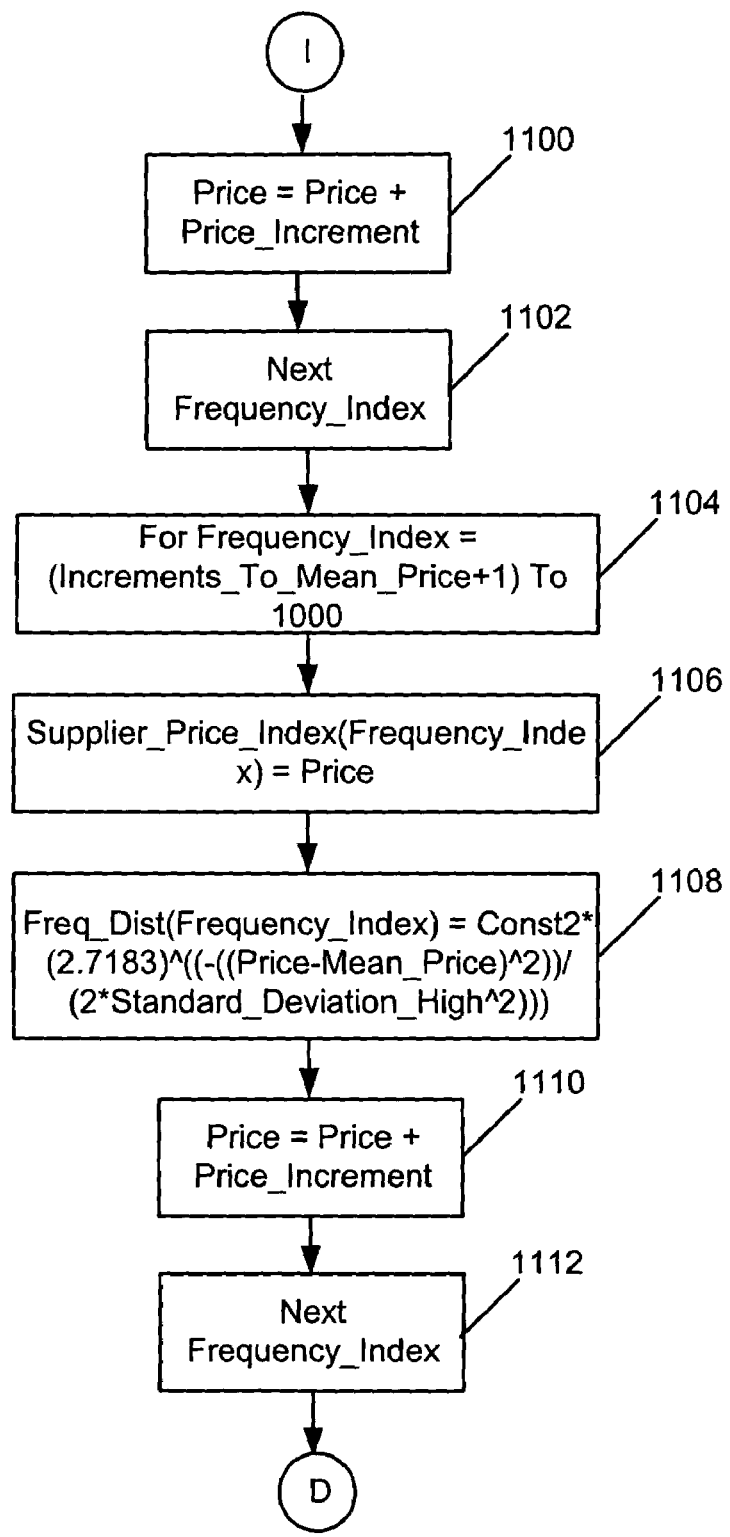
FIG. 11 is a flow chart illustrating the continued creation of the upper portion of the Frequency Distribution Array.

FIG. 11 illustrates the continued creation of the upper portion of the Frequency Distribution Array. The next value for the variable Price 1008 is calculated in 1100. The Frequency_Index 1102 is increment and the instruction in the loop 1010 repeated unitl the value of Frequency_Index 1010 is equal to Increments_To_Mean_Price 1010 plus one. Programming loop defined by steps 1104 through 1112 is established that increments Frequency_Index 1104 from the value of Increments_To_Mean_Price 1104 plus one in steps of one to 1000 inclusive. The Supplier_Price_Index 1106 array is set to the value contained in the variable Price 1106. The value for Freq_Dist 1108 array is calculated. The value of Price 1110 is incremented by the value of Price_Increment 1110. The Frequency_Index 1112 is incremented and the instructions in programming loop defined by steps 1102 through 1112 is repeated until the value of Frequency_Index 1104 is equal to Increments_To_Mean_Price 420 plus one.

Figure 12:
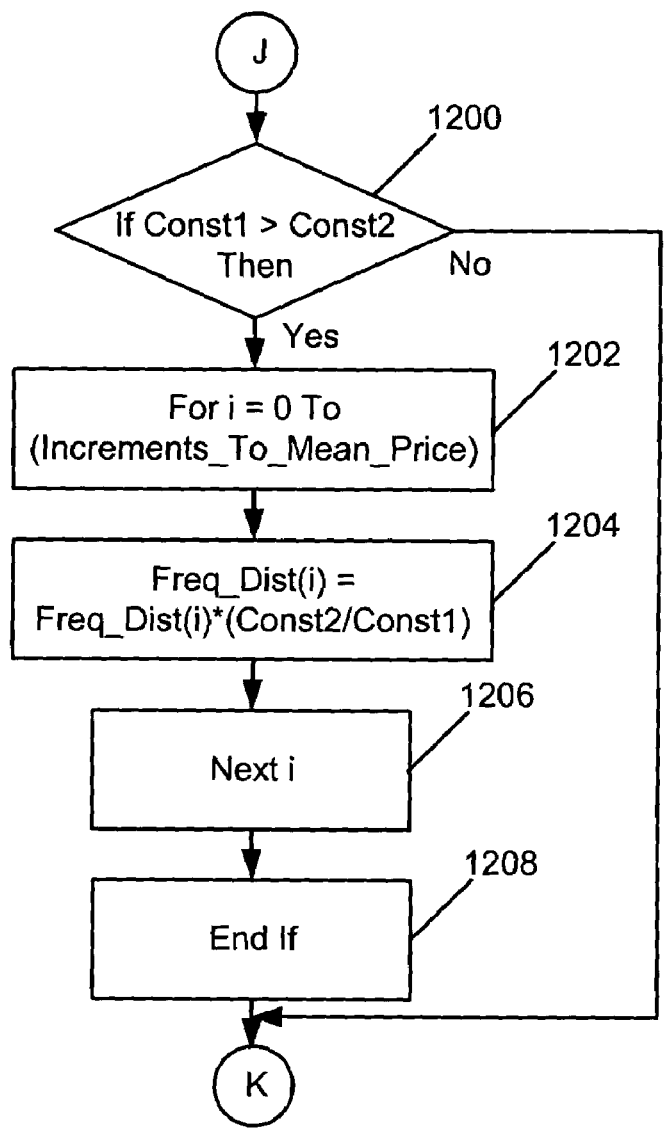
FIG. 12 is a flow chart illustrating the smoothing of the Frequency Distribution Array data.

FIG. 12 illustrates the smoothing of the Frequency Distribution Array data. The flow diagram that is the continuation of the Frequency Distribution Engine 118 referenced in FIG. 1 and relates to the normalization of the two halves of the distribution curve. The normalization begins with a determination 1200 of whether Const1 1200 is larger than Const2 1200. If it the determination 1200 is true, then a programming loop defined by steps 1202 through 1206 is initiated where i 1202 is initialized to zero and incremented by one to a value of Increments_To_Mean_Price 1202 plus one. The value stored in the array Freq_Dist(i) 1204 is multiplied by the ratio of Const2 1204 divided by Const1 1204 and restored in Freq_Dist(i) 1204. Then the value of i 1206 is incremented and the loop defined by 1202 through 1206 repeated. If Const 1 1200 is not larger than Const2 1200, then the determination results in the End If 1208 statement.

Figure 13:
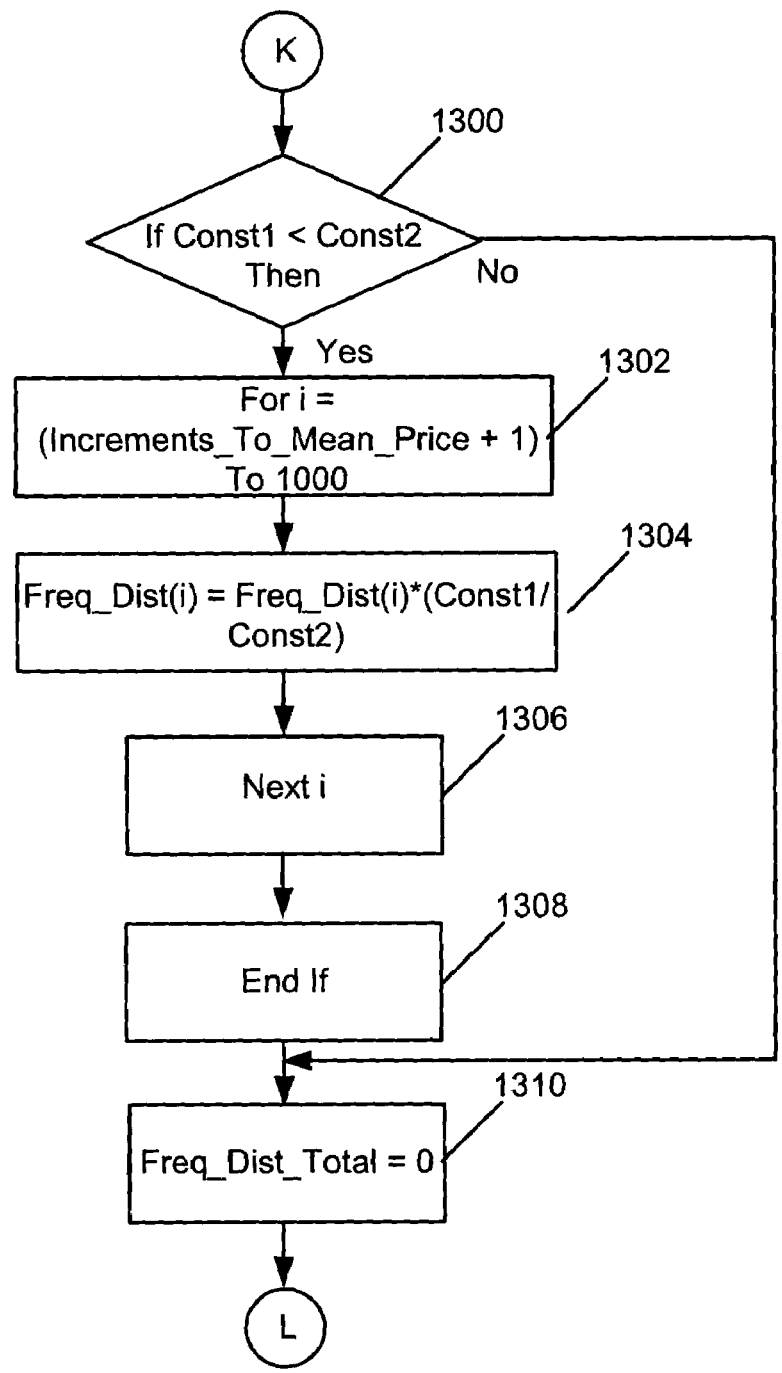
FIG. 13 is a flow chart illustrating the continued smoothing of the Frequency Distribution Array data.

FIG. 13 illustrates the continued smoothing of the Frequency Distribution Array and the determination of the Expected Results Array. If the determination 1200 is false, then a second determination 1300 of whether Const1 1300 is less than Const2 1300. If the determination 1300 is true, then a programming loop 1302 through 1306 is established where i 1302 is initialized to a value of Increments_To_Mean_Price 1302 plus one and stepped by increments of one. The value stored in the array Freq_Dist(i) 1304 is multiplied by the ratio of Const2 1304 divided by Const1 1304 and restored in Freq_Dist(i) 1304. The value of i 1306 is incremented and the programming loop defined by 1302 through 1306 repeated. Once the programming loop defined by 1302 through 1306 is complete, a variable which represents the integrated value of the Frequency Distribution Array, Freq_Dist_Total 1310 is set to zero. If the determination of 1300 is false, then the routine proceeds to step 1310 where Freq_Dist_Total is set to zero.

The Probability of Win Engine 120 referenced in FIG. 1 calculates the probability of a customer purchasing a subject good or service based on a factor called Offer Opportunities.

Specifically, Offer Opportunities define the number of customers that are exposed to a specific offer to sell said good or service at a designated price. The Probability of Win Engine 120 overcomes disadvantage of the prior art by eliminating the assumption that a good or service priced at a specific value will yield a predictable amount of sales regardless of the number of customers that were exposed to the specific offer to sell said good or service at a designated price. For programming expediency, the Probability of Win Engine 120 is embedded in the Expected Results Engine 122.

Figure 14:
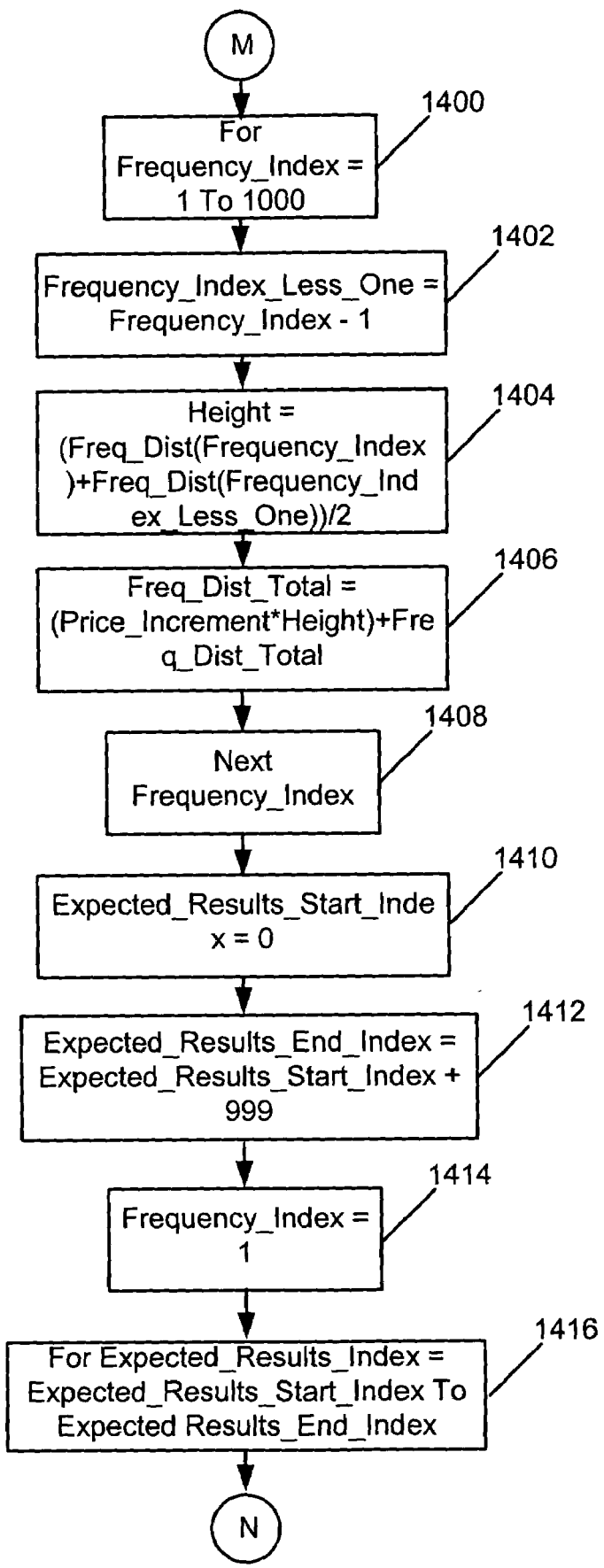
FIG. 14 is a flow chart illustrating the integration of the Frequency Distribution Array and the determination of the Expected Results Array

FIG. 14 shows the flow diagram that is part of the Expected Results Engine 122 referenced in FIG. 1. The programming loop defined by steps 1400 through 1408 is used to integrate, or sum, the values defined by the first and last array element of the Frequency Distribution Array. The programming loop defined by steps 1400 through 1408 is initiated by setting Frequency_Index 1400 to one and then incrementing in steps of one to 1000 for each loop. Frequency_Index_Less_One 1402 is calculated. The variable Height 1404 is calculated by taking the average of two adjacent values of array Freq_Dist 1404 for a given value of Frequency_Index 1404. Freq_Dist_Total 1406 is calculated by multiplying the Price_Increment 1406 by the Height 1406 and summing to the previous value of Freq_Dist_Total 1406. The next Frequency_Index 1408 is calculated by incrementing Frequency_Index 610 by one. The programming loop defined by 1400 through 1408 is repeated until Frequency_Index 1400 equals 1001.

On completion of the programing loop defined by steps 1400 through 1408, the value of Expected_Results_Index 1410 is set to zero. The value of Expected_Results_End_Index 1412 is calculated. The value of Frequency_Index 1414 is set to one. The programming loop defined by 1416 through 1608 is established where the value of Expected_Results_Index 1416 is set to the value of Expected_Results_Start_Index 1416 and is incremented by one until Expected_Results_End_Index 1416 is exceeded by a value of one.

Figure 15:
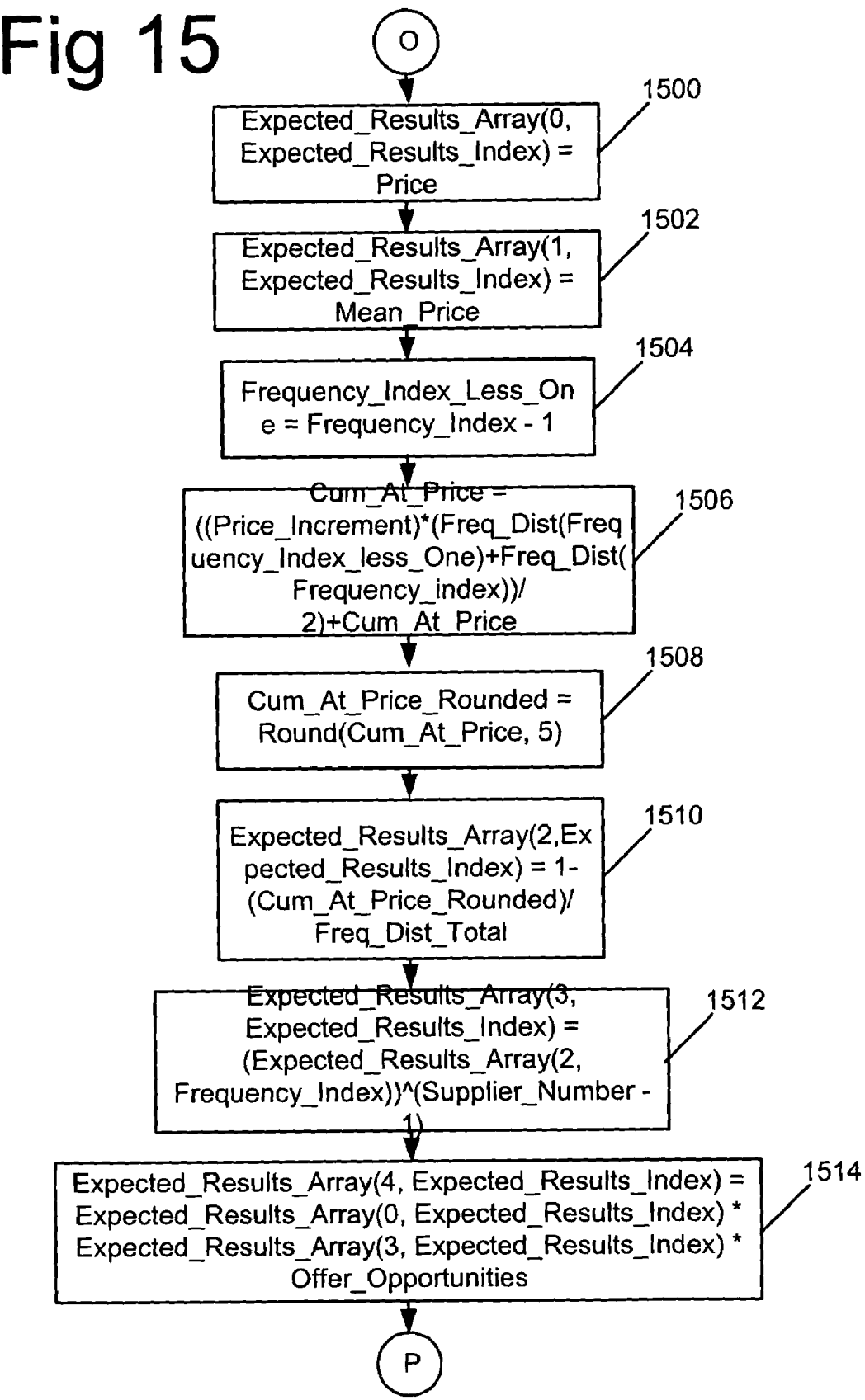
FIG. 15 is a flow chart illustrating the continued determination of the Expected Results Array.

FIG. 15 shows the continuation of the flow diagram that is part of the Expected Results Engine 122 referenced in FIG. 1. The Price 1500 is stored in the Expected_Results_Array 1500 column zero. The Mean_Price 1502 is stored in the Expected_Results_Array 1502 column one. The value for Frequency_Index_less_One 1504 is calculated. The value for Cum_At_Price_Rounded 1508 which represents the integral from the value Low_End 306 to the current value of Price 1500 is calculated. The value for Expected_Results_Array 1510 column two is calculated and depicts the probability of win with one competitor. The value for Expected_Results_Array 1512 column three is calculated and depicts the probability of win with for more than one supplier. The value for Expected_Results_Array 1514 column four is calculated and depicts the anticipated revenue for a specific price based on the number of offer opportunities.

The incorporation of the number of suppliers in the market represents a significant advantages over prior art because there is not the assumption that the number of competitors at the time the yield curve was constructed remained the same. Particularly in global markets, the number of competitors can change in a relatively short time frame which can potentially invalidate the yield curve. By quantifying and integrating the number of suppliers in the subject market, a more accurate and reliable determination of the optimum price can be made.

Figure 16:
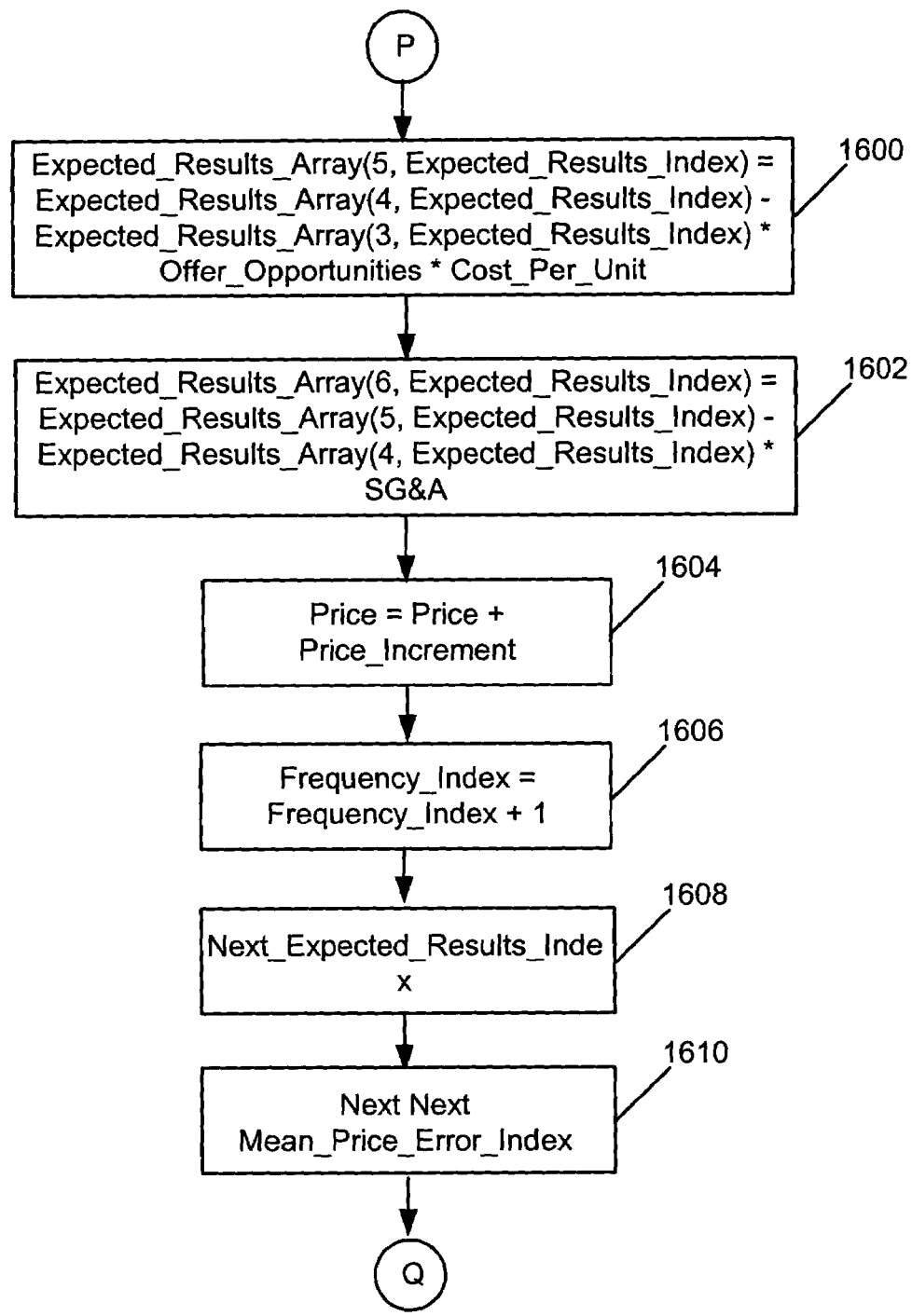
FIG. 16 is a flow chart illustrating the continued determination of the Expected Results Array.

FIG. 16 shows the continuation of the flow diagram that is part of the Expected Results Engine 122 referenced in FIG. 1. The value for Expected_Results_Array 1600 column five is calculated and depicts the anticipated gross profit for a specific price based the anticipated revenue and cost-of-goods. The value for Expected_Results_Array 1602 column six is calculated and depicts the anticipated earnings before income tax. The value of Price 1604 is incremented. The value of Frequency_Index 1606 is incremented. The value of Next_Expected_Results_Index 1608 is incremented and the programming loop defined by steps 1416 through 1610 repeated until Expected_Results_End_Index plus one is reached.

Figure 17:
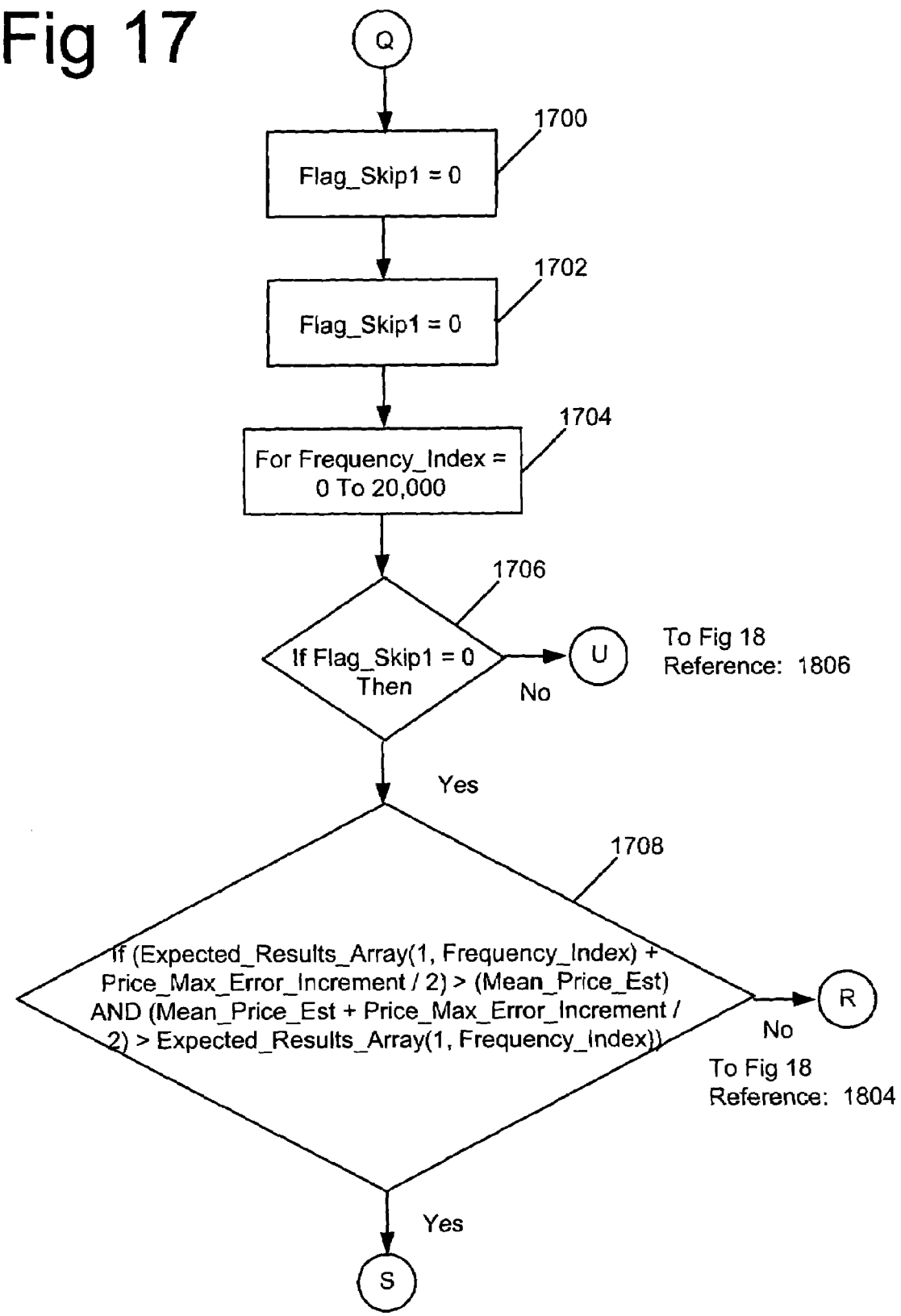
FIG. 17 is a flow chart illustrating the search for Mean Price Estimate plus and minus an uncertainty in the Expected Results Array.

FIG. 17 shows the continuation of the flow diagram that is part of the Expected Results Engine 122 referenced in FIG. 1. FIG. 17 initiates the steps associated with identifying the first and last indexes of values contained in Expected Results Array corresponding to the current value Mean_Price_Est. As a result of potential rounding error, an uncertainty for Mean_Price_Est may be incorporated into the search. Flag_Skip_1 1700 is set to zero indicating that the first value of interest in a subsequent search has not been found. Flag_Skip 2 1702 is set to zero indicating that the second value of interest in a subsequent search has not been found. A programming loop defined by steps 1704 through 2000, is established to search the for the first index in the Expected Results Array where the value of Mean Price plus or minus a tolerance equals Mean_Price_Est. The For statement 1704 initiates the programming loop defined by 1704 through 2000. A determination of whether Flag_Skip1 1706 is equal to zero is made. If Flag_Skip1 1706 is not equal to zero, then step 1806 is executed. If Flag_Skip1 1706 is equal to zero, then the value of Mean Price contained in the Expected_Results_Array 1708 is checked starting with the index value corresponding to Frequency_Index 1708. If the Mean Price value is equal to Mean_Price_Est 1708, the program proceeds to the steps shown in FIG. 18.

Figure 18:
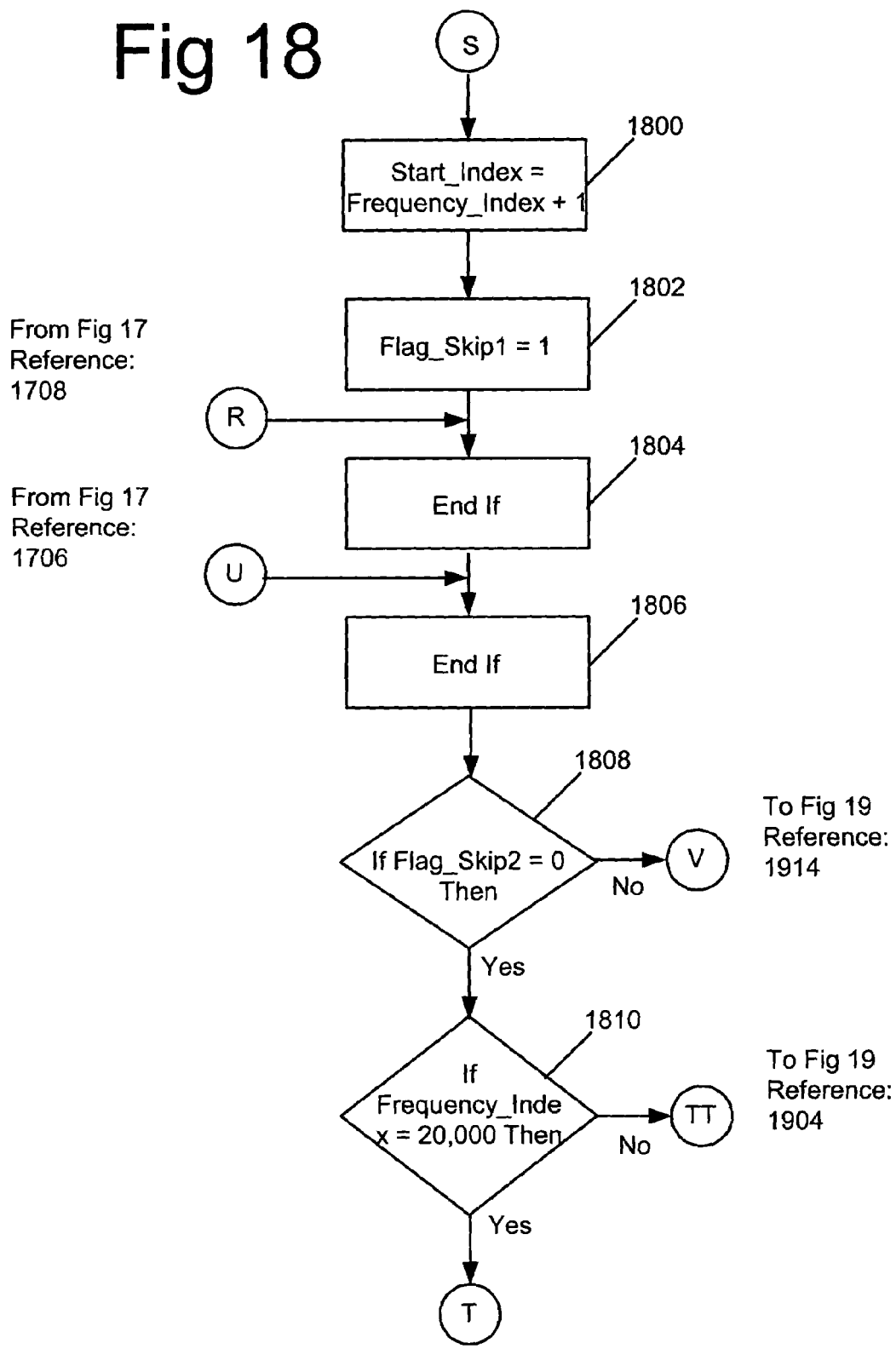
FIG. 18 is a flow chart illustrating the continued search for Mean Price Estimate plus and minus an uncertainty in the Expected Results Array.

FIG. 18 shows the continuation of the flow diagram that is part of the Expected Results Engine 122 referenced in FIG. 1. FIG. 18 illustrates the continued search in the Expected Results Array corresponding to the first index value of the array element Mean Price corresponding to the value stored in the variable Mean_Price_Est. If the value corresponding to Mean Price contained in the Expected_Results_Array is equal to Mean_Price_Est, then the value of Start_Index 1800 is set to Frequency_Index 1800 plus one. Flag_Skip1 1802 is set to one indicating that the index of the first Mean Price in Expected_Results_Array has been identified. A determination is made as to whether Flag_Skip2 1808 is equal to zero. If Flag_Skip2 1808 is not equal to zero, the last instance of the Mean Price in Expected_Results_Array has not been identified, and the program proceeds to the steps listed in FIG. 19. If Flag_Skip2 1808 is equal to zero, then a determination is made as to whether Frequency_Index 1810 is equal to 20,000, and then the steps shown in FIG. 19 executed.

Figure 19:
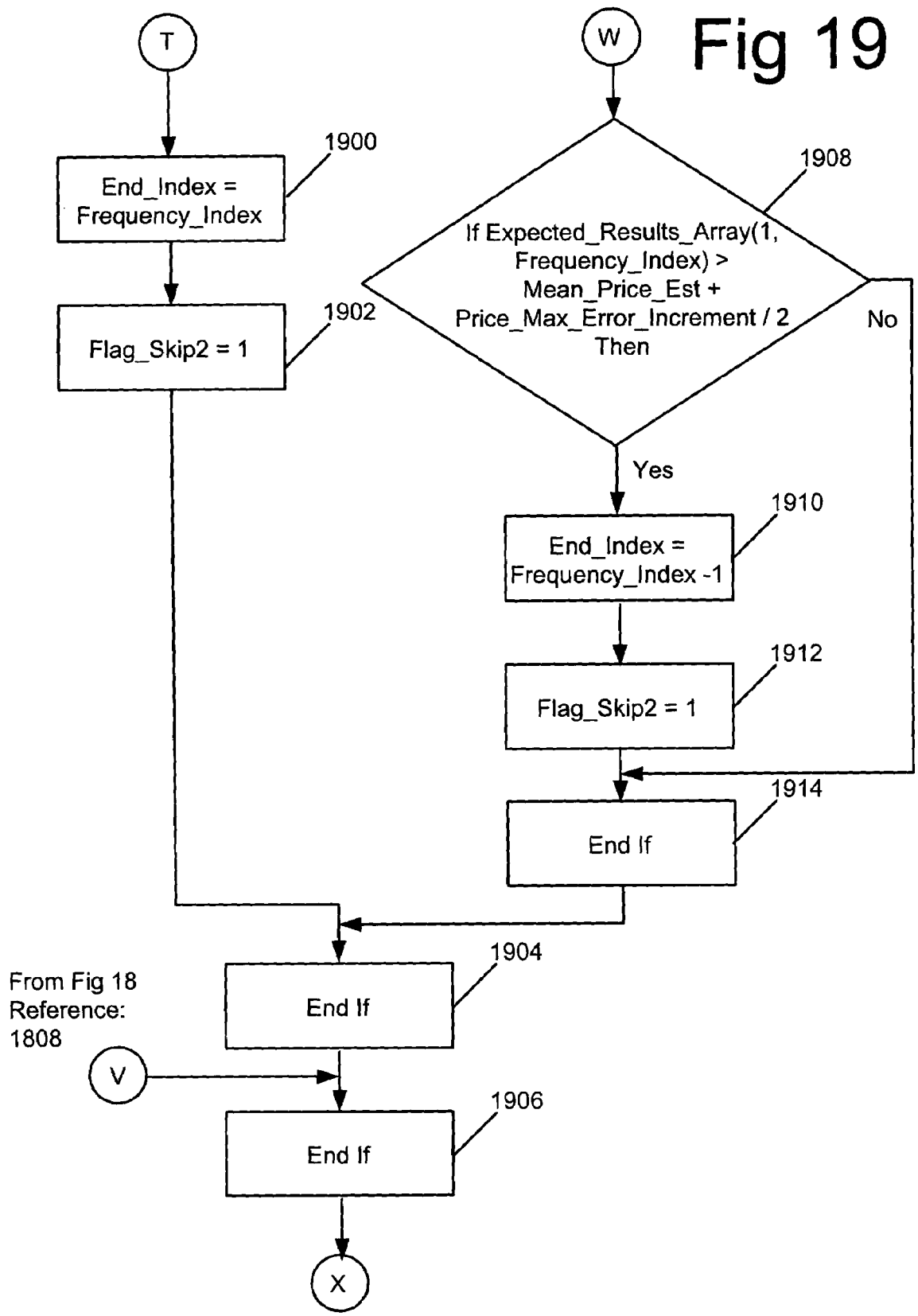
FIG. 19 is a flow chart illustrating the continued search for Mean Price Estimate plus and minus an uncertainty in the Expected Results Array.

FIG. 19 shows the continuation of the flow diagram that is part of the Expected Results Engine 122 referenced in FIG. 1. FIG. 19 illustrates the continued search in the Expected Results Array corresponding to the first and last index value of the array element Mean Price corresponding to the value stored in the variable $Mean_{1\ Price}$_Est. If the determination of Flag_Skip2 1808 equal to zero is not true, then the If 1 1808 statement is terminated in step 1906. If the determination of Flag_Skip 1808 equal to zero is true, then the determination of Frequency_Index 1810 equal to 20,000 is made. If Frequency_Index 1810 is equal to 20,000, then true, then the value of Frequency_Index is assigned to the variable End_Index 1900. Flag_Skip2 1900 is set to one and the If 1810 statement is terminated in 1904. If the determination that Frequency_Index is equal to 20,000 is true, and value of Mean Price contained in the Expected_Results Array 1908 is checked starting with the index value corresponding to Frequency_Index 1908. If the Mean Price value is equal to Mean_Price_Est 1908, the program proceeds to store the value of Frequency_Index less one in the variable End_Index 1810. The variable Flag_Skip2 1812 is set to one indicating that no further checking is necessary. If the Mean Price value is not equal to Mean_Price_Est 1908, the program proceeds to the End If 1814 statement.

Figure 20:
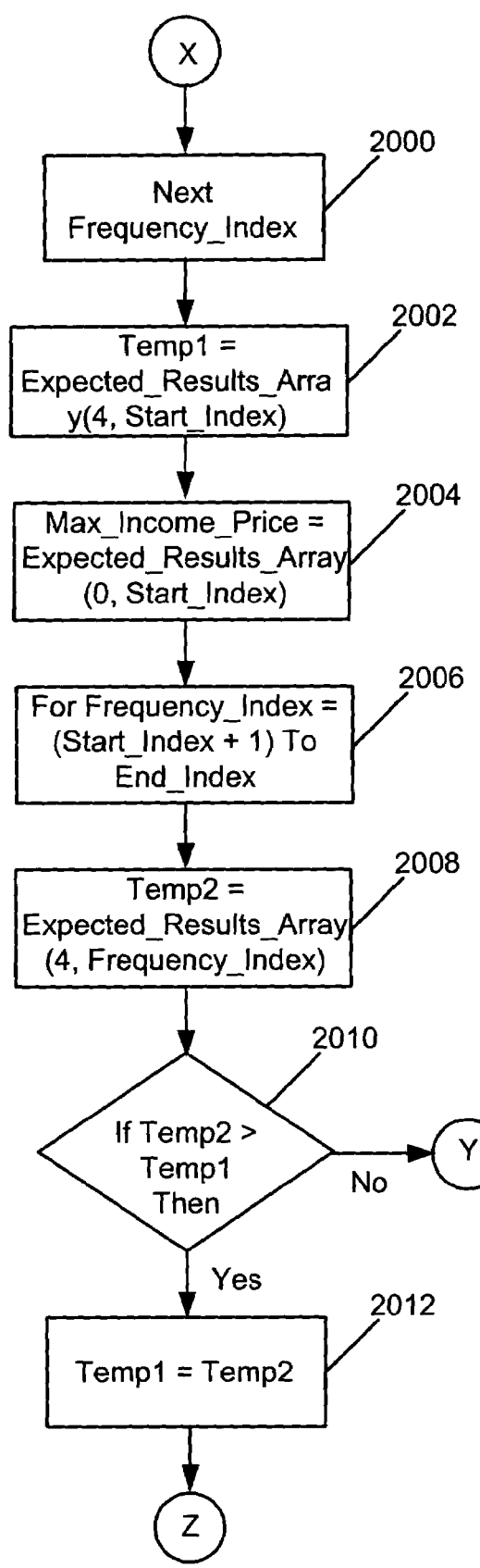
FIG. 20 is a flow chart illustrating the search in the Expected Results Array for the price that yields the maximum income.

FIG. 20 shows the continuation of the flow diagram that is part of the Expected Results Engine 122 referenced in FIG. 1. FIG. 20 illustrates the search in the Expected Results Array for the price and corresponding index that yields the maximum income. The Next 2000 statement completes the programming loop defined by steps 1704 to 2000 associated with the search for the first and last index values of the array elements Mean Price corresponding to the value stored in the variable Mean_Price_Est. Temp1 2002 is assigned the first value of income in the Expected_Results_Array 2002 corresponding to the element pointed to by Start_Index 2002. The corresponding price to the first value of income in the Expected_Results_Array 2004 is assigned to variable Max_Income Price 2004. A programming loop defined by steps 2006 through 2106 is established. The For 2006 statement will increment Frequency_Index 2006 from Start_Index+1 2006 to End_Index 2006. Temp2 2008 stores the next array element in Expected_Results_Array depicting the projected income. A determination is made as to whether Temp2 2010 is larger than Temp1 2010, and if true, then Temp2 2012 is assigned to Temp1 2012 and the program proceeds to the steps shown in FIG. 21. If the determination of whether Temp2 2010 is larger than Temp1 2010 is false, then the program proceeds to the steps shown in FIG. 21.

Figure 21:
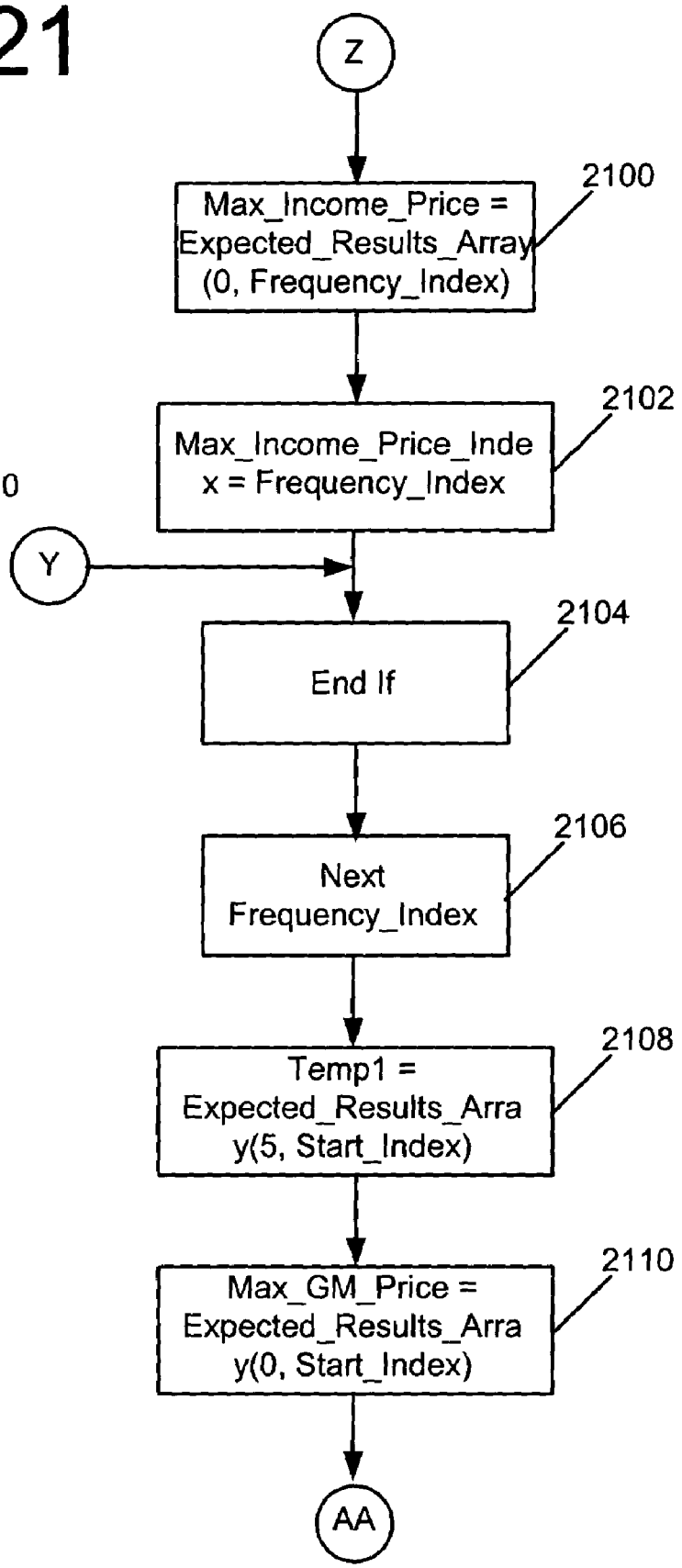
FIG. 21 is a flow chart illustrating the search in the Expected Results Array for the price and corresponding index that yields the maximum income and the search in the Expected Results Array for the price that yields the maximum profit.

FIG. 21 shows the continuation of the flow diagram that is part of the Expected Results Engine 122 referenced in FIG. 1. FIG. 21 illustrates the continued search in the Expected Results Array for the price and corresponding index that yields the maximum income. Max_Income_Price 2100 is set based on the first price entry in the Expected_Results_Array 2100. The Max_Income_Price_Index 2102 is set to the current Frequency_Index 2102. The End If 2104 statement terminates the If 2010 statement. The Frequency_Index 2106 is incremented and the programming loop defined by steps 2006 through 2106 repeated until Frequency_Index 2006 exceeds End_Index 2006 by one.

After the programming loop defined by steps 2006 through 2106 is completed, the program begins the process of identifying the price representing the highest gross profit. Temp1 2108 is assigned the gross profit value in the Expected_Results_Array 2108 based on Start_Index 2108. The price stored in the Expected_Results_Array corresponding to Temp1 2108 is stored in Max_GM_Profit 2110.

Figure 22:
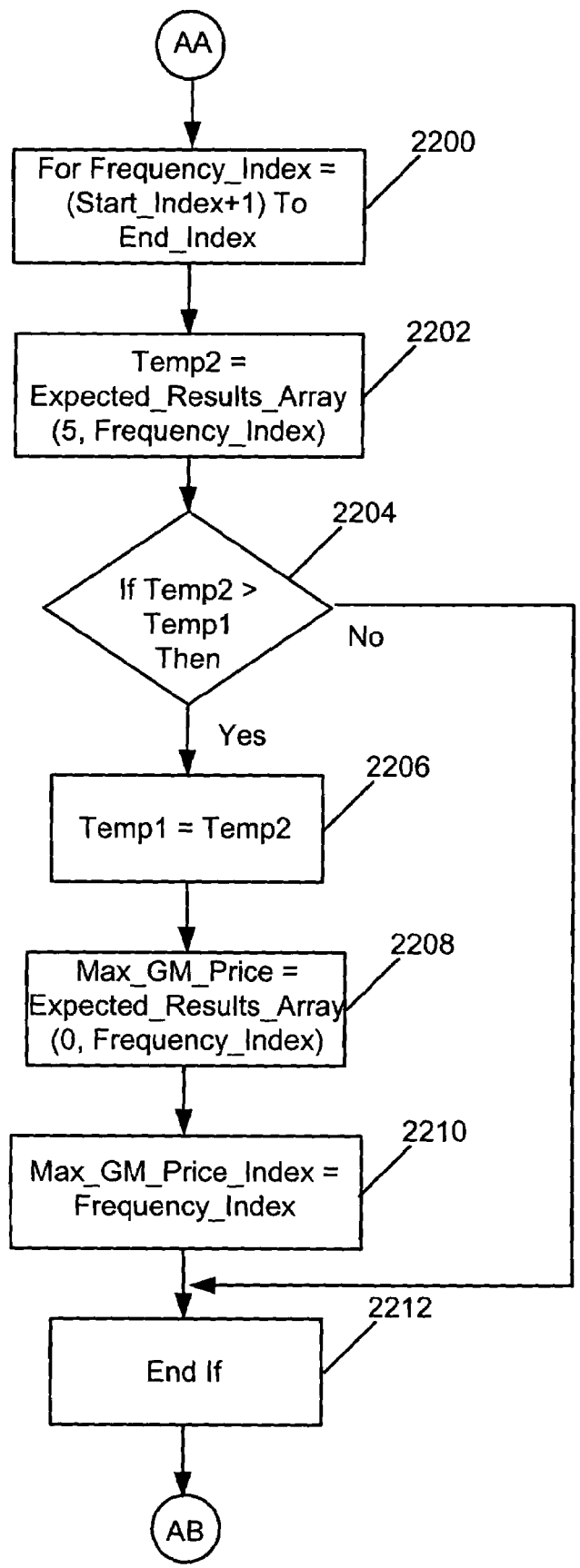
FIG. 22 is a flow chart illustrating the continued search in the Expected Results Array for the price and index that yields the maximum profit.

FIG. 22 shows the continuation of the flow diagram that is part of the Expected Results Engine 122 referenced in FIG. 1. FIG. 22 illustrates the continued search in the Expected Results Array for the price and index that yields the maximum profit. A programming loop defined by steps 2200 through 2300 is initiated by the For 2200 statement. Frequency_Index 2200 is stepped in increments of one starting with the value (Start_Index+1) 2200 to End_Index 2200. Temp2 2202 is assigned the value in Expected_Results_Array 2202 corresponding to profit pointed to by Frequency_Index 2202. A determination is made in as to whether Temp2 2204 is larger than Temp1 2204. If the determination is not true, then the If statement is terminated in the End If 2212 statement. If the determination is true, then Temp2 2206 is assigned to Temp1 2206. Max_GM_Price 2208 is assigned the value corresponding to price stored in the Expected_Results_Array 2208 pointed to by Frequency_Index 2208.

Max_GM_Price_Index 2210 is assigned the current value of Frequency_Index 2210. The Frequency_Index 2300 is incremented by one and the programming loop defined by steps 2200 through 2300 repeated until the value of End_Index 2200 is exceeded by one.

Figure 23:
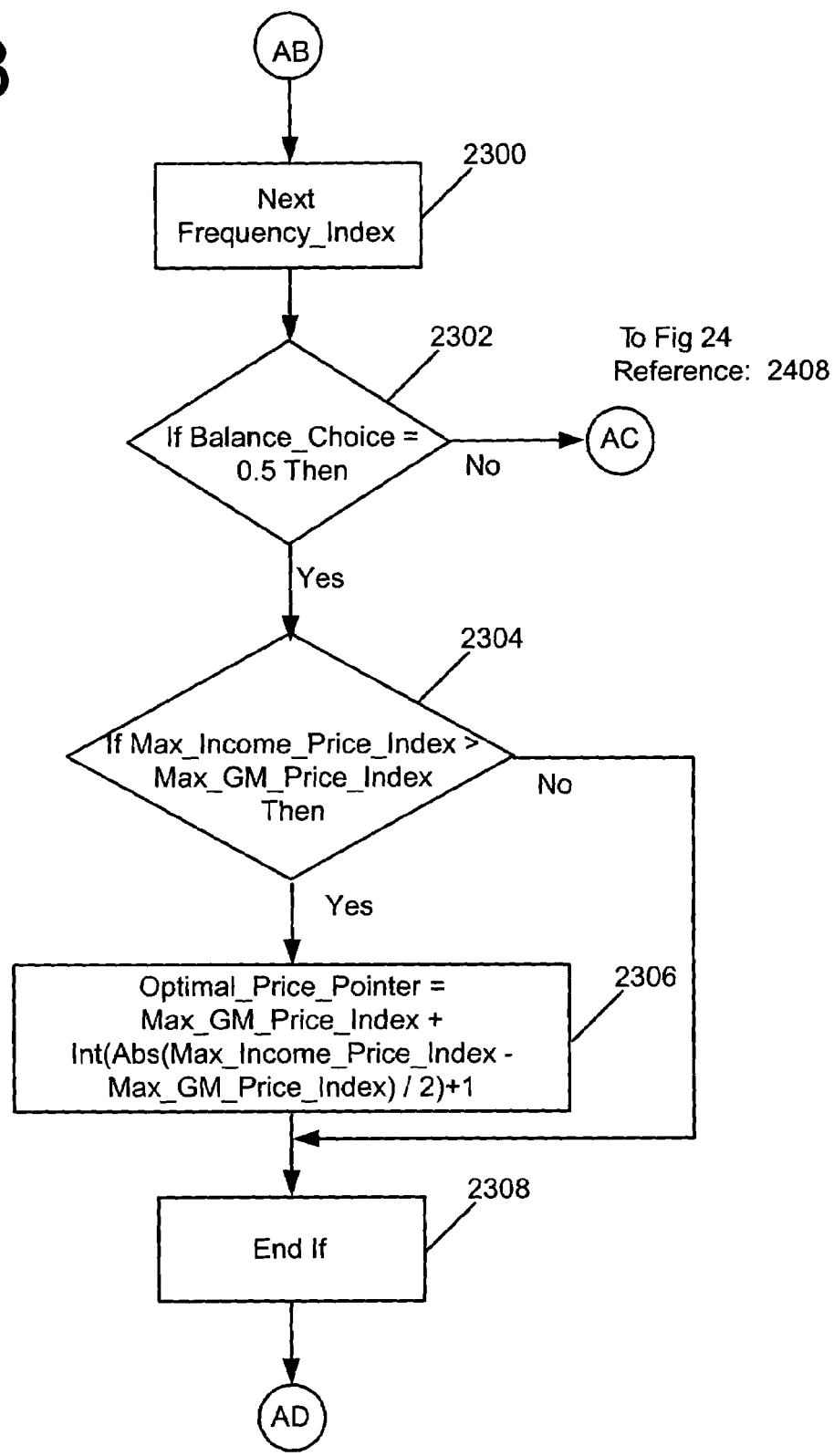
FIG. 23 is a flow chart illustrating the determination of price so that the objectives of maximum income and profit are balanced.

FIG. 23 shows the continuation of the flow diagram that is part of the Expected Results Engine 122 referenced in FIG. 1. FIG. 23 illustrates the determination of price so that the objectives of maximum income and profit are balanced. A determination of whether the variable Balance_Choice 2302 equal to 0.5 is made. If the determination is not true, the program proceeds to the End If 2408 statement. If the determination is true, then the user has specified the program optimize the selection of price by balancing the objectives of profit and income, and the program proceeds to step 2304.

A determination is made as to whether Max_Income_Price_Index 2304 is greater than Max_GM_Price_Index 2304. If the determination is not true, then the program proceeds to the End If 2308 statement. If the determination is true, then the program assigns Optimal_Price_Pointer 2306 with the value calculated by averaging the difference of index pointers Max_GM_Price_Index 2306 and Max_Income_Price_Index 2306 and summing Max_GM_Price_Index 2306.

Figure 24:
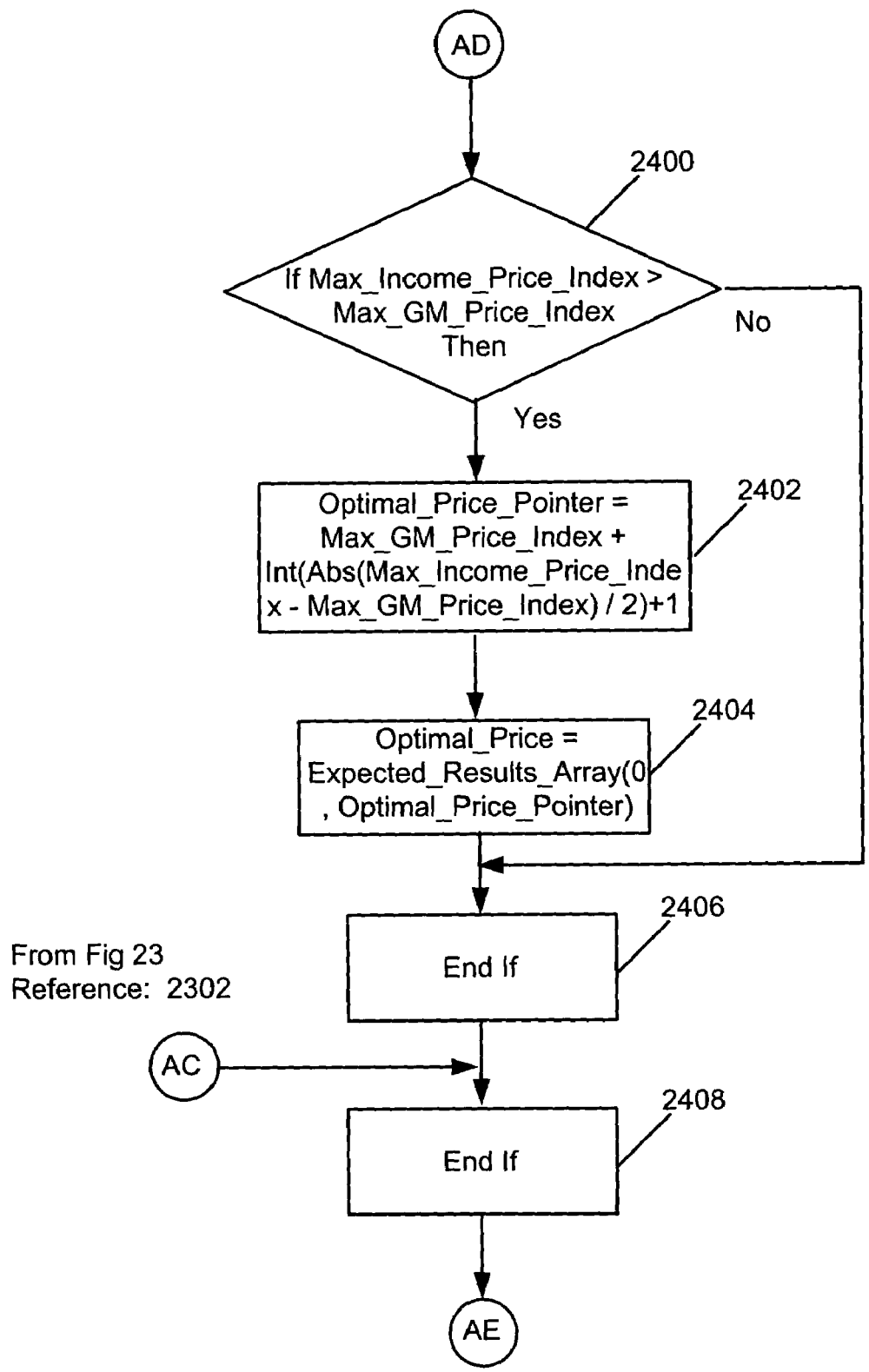
FIG. 24 is a flow chart illustrating the continued determination of price so that the objectives of maximum income and profit are balanced.

FIG. 24 shows the continuation of the flow diagram that is part of the Expected Results Engine 122 referenced in FIG. 1. FIG. 24 illustrates the continued determination of price so that the objectives of maximum income and profit are balanced. A determination of whether Max_Income_Price_Index 2400 is greater than Max_GM_Price_Index 2400 is made. If the determination is not true, then the program proceeds to the End If 2406 statement. If the determination is true, then the program assigns Optimal_Price_Pointer 2402 with the value calculated by averaging the difference of index pointers Max_GM_Price_Index 2402 and Max_GM_Price_Index 2402 and summing Max_GM_Price_Index 2402. Optimal_Price 2404 is assigned the value of price stored in Expected_Results_Array 2404 pointed to by the value stored in Optimal_Price_Pointer.

Figure 25:
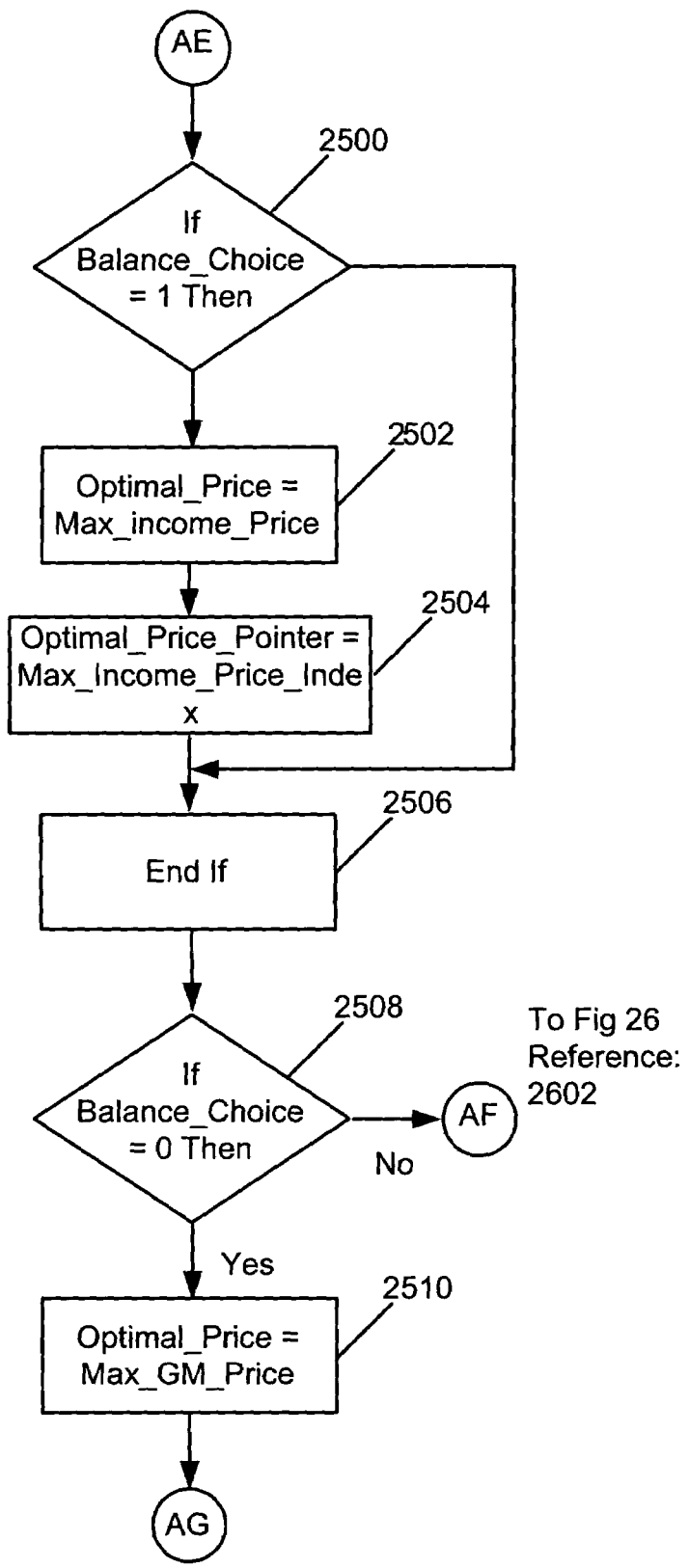
FIG. 25 is a flow chart illustrating the assignment of variables if the objective is to maximize income.

FIG. 25 shows the continuation of the flow diagram that is part of the Expected Results Engine 122 referenced in FIG. 1. FIG. 25 illustrates the assignment of variables if the objective is to maximize income. A determination is made as to whether Balance_Choice 2500 is equal to one. If the determination is not true, then the If 2500 statement terminates in the End If 2506 statement. If the determination is true, then the variable Optimal_Price 2502 is assigned Max_Income_Price 2502. Optimal_Price_Pointer 2504 is assigned the value of Max_Income_Price_Index 2504.

A determination is made as to whether Balance_Choice 2508 equals zero. If the determination is not true, then the If 2508 statement terminates in the End If 2602 statement. If the determination is true, then the variable Optimal_Price 2510 is assigned the value stored in Max_GM_Price 2510. Optimal_Price_Pointer 2600 is assigned the value of Max_GM_Price_Index 2600.

Figure 26:
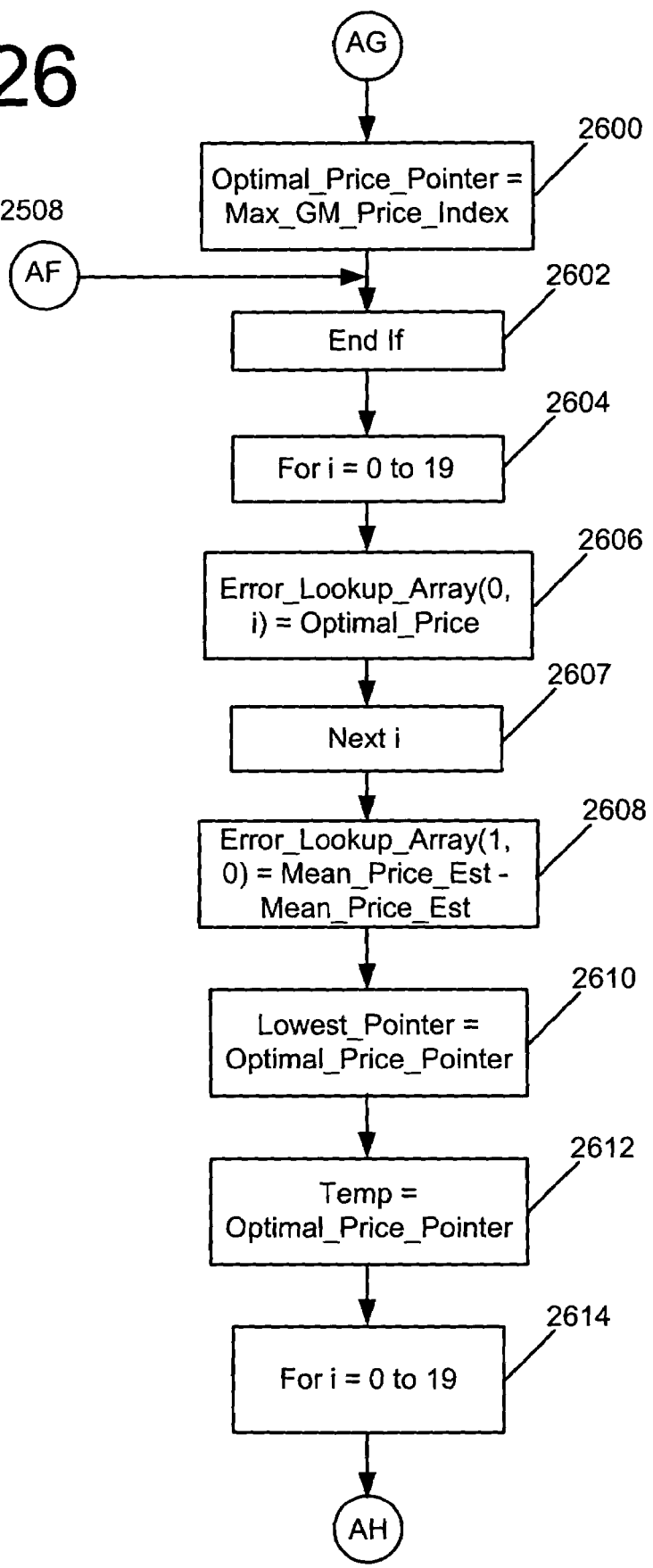
FIG. 26 is a flow chart illustrating the assignment of variables if the objective is to maximize profit and store the optimal price in the Expected Results Array.

FIG. 26 shows the continuation of the flow diagram that is part of the Expected Results Engine 122 referenced in FIG. 1. If the percentage difference is expected and actual win rates are outside a predefined window, a table that defines a relationship between the actual win rate, the current optimized price, and new mean price is used to update the optimization. FIG. 26 illustrates the steps used to determine the contents of the Error Lookup Array. A programming loop defined by steps 2604 through 2607 is initiated with the For 2604 statement, with i 2604 set to zero and stepped in increments of one to 19. The elements of Error_Lookup_Array(0,i) 2606 are populated with the value of Optimal_Price 2606 based on index i. i 2607 is incremented and the programming loop defined by steps 2604 through 2607 repeated. Error_Lookup_Array(1,0)2608 is assigned the lowest Mean_Price_Est 2608 given the largest error as defined by Price_Max_Error 2608. The value of Optimal_Price_pointer is assigned to Lowest_Pointer 2610 and to Temp 2612. A programming loop defined by steps 2614 through 2708 is established with the For 2614 statement, where i is set to zero and incremented by one to a value of 19.

Figure 27:
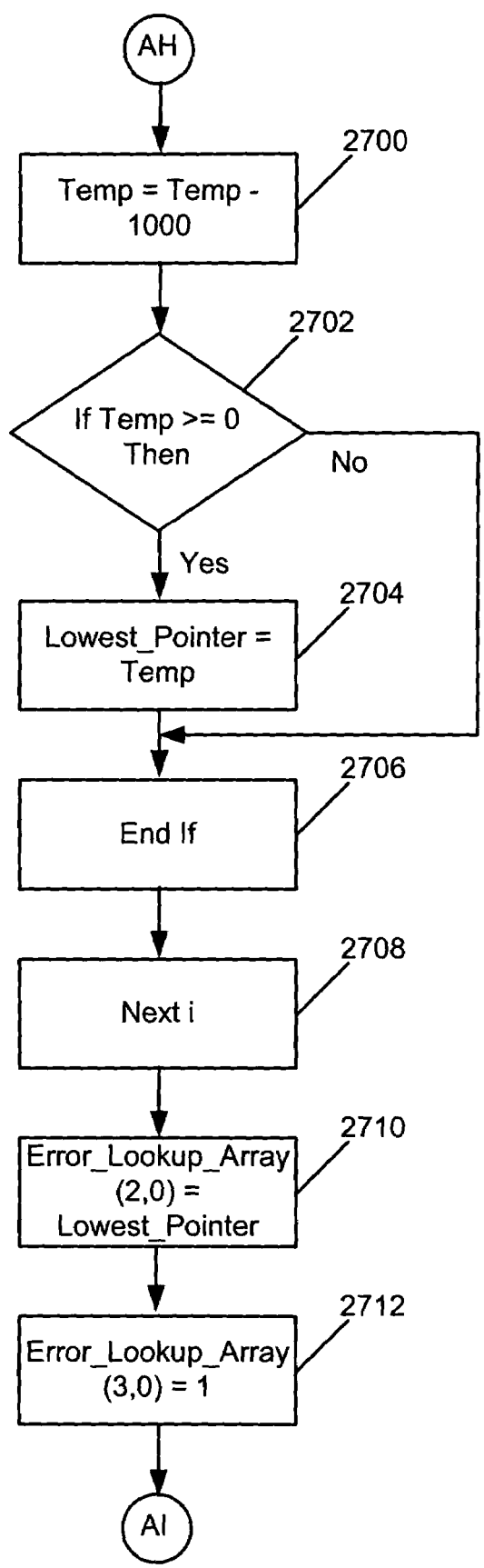
FIG. 27 is a flow chart illustrating the determination of the Error Lookup Array contents.

FIG. 27 shows the continuation of the flow diagram that is part of the Expected Results Engine 122 referenced in FIG. 1. Steps 2700 through 2710 find the lowest index to the optimal price for a given Mean Price. Temp 2700 is assigned a new value determined by subtracting 1000 from the original value of Temp 2700. A determination of whether Temp 2702 is equal to, or greater than zero is made. If the determination is not true, then the If 2702 statement is terminated in the End If 2706 statement. If the determination 2702 is true, then Lowest_Pointer 2704 is set equal to Temp 2704. i 2708 is incremented and the programming loop defined by steps 2614 to 2708 repeated. Error_Lookup_Array(2,0) 2710 is set equal to the value stored in Lowest_Pointer 2710. The first index of the first Mean_Price set is stored in Error_Lookup_Array(3,0) 2712 by setting it equal to one.

Figure 28:
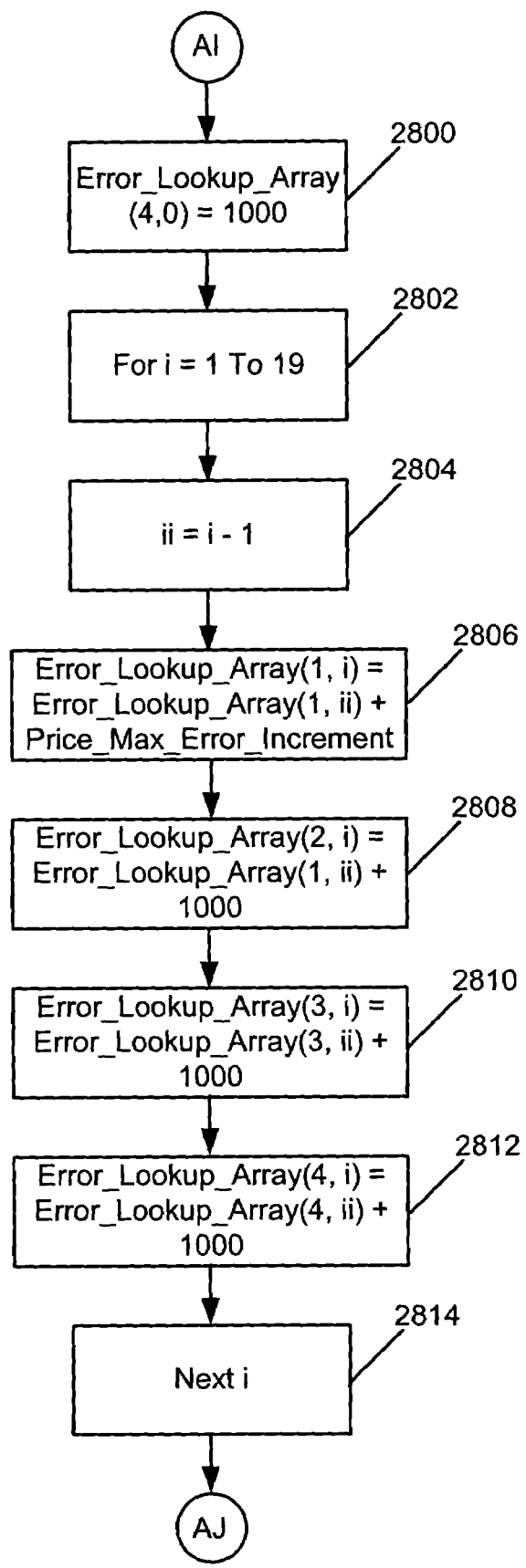
FIG. 28 is a flow chart illustrating the continued determination of the Error Lookup Array contents.

FIG. 28 shows the continuation of the flow diagram that is part of the Expected Results Engine 1220 referenced in FIG. 1. The last index of the first Mean_Price set is stored by setting the Expected_Results_Array(4,0) 2800 equal to 1000. A programming loop defined by steps 2802 to 2814 is initiated by the For 2802 statement, and populates the Error_Lookup_Array. The programming loop increments i 2802 from 1 to 19 in steps of one. The variable ii 2802 is calculated by subtracting one from i 2804. The value of Error_Lookup_Array(1,i) 2806 is calculated by adding the Price_Max_Error_Increment 2806 to Error_Lookup_Array (i,ii) 2806. The value of Error_Lookup_Array(2,i) 2808 is calculated by adding 1000 to Error_Lookup_Array(2,ii). The value of Error_Lookup_Array(3,1) 2810 is calculated by adding 1000 to Error_Lookup_Array(3,ii) 2810. Error_Lookup_Array(4,i) 2812 is calculated by adding 1000 to Error_Lookup_Array(4,ii) 2812. i is incremented by one and the programming loop defined by steps 2802 through 2814 repeated.

Figure 29:
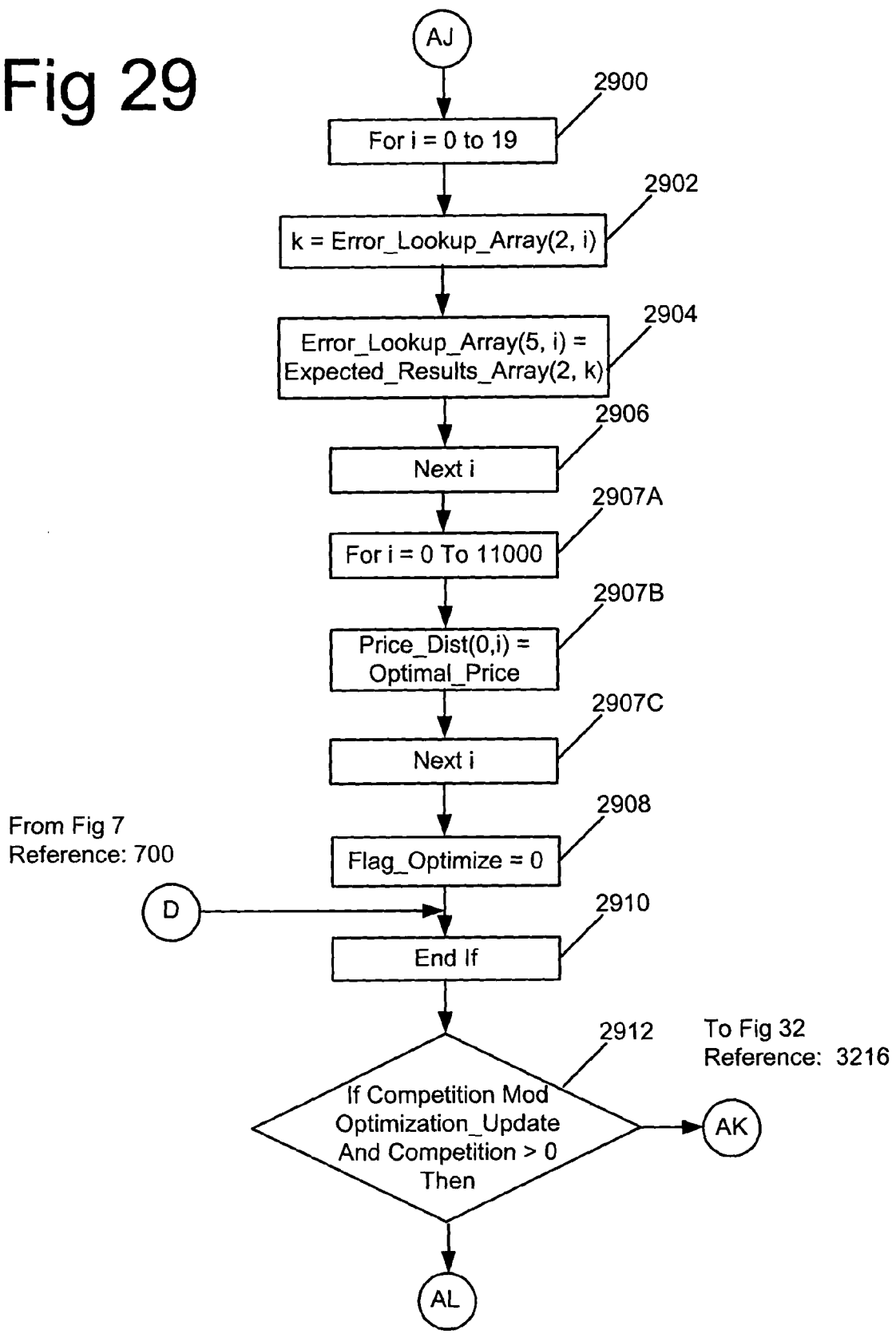
FIG. 29 is a flow chart illustrating the continued determination of the Error Lookup Array contents, completion of the optimization loop, and test to determine if price optimization should be updated.

FIG. 29 steps 2900 through 2910 shows the continuation of the flow diagram that is part of the Expected Results Engine 122 referenced in FIG. 1. A programming loop defined by 2900 through 2906 is established by the For 2900 statement.i 2900 is set to zero and incremented in steps of one to 19. k 2902 is set equal to the value stored in Error_Lookup_Array(2,i). Error_Lookup_Array(5,I) 2904 is set equal to the value in Expected_Results_Array(2,k) 2904. i is incremented by one and the programming loop defined by steps 2900 through 2906 repeated. A programming loop is established with steps 2907A through 2907C and is initiated by the For statement 2907A. i 2907A is set to zero and stepped in increments of one to 11000 plus one. The indexed array of Price_Dist 2907B is set equal to Optimal_Price 2907B. The programming loop 4607A through 4607C is repeated until 11000 plus one is reached. The value of Flag_Optimization 2908 is set to zero indicating that the optimization is complete.

Figure 30:
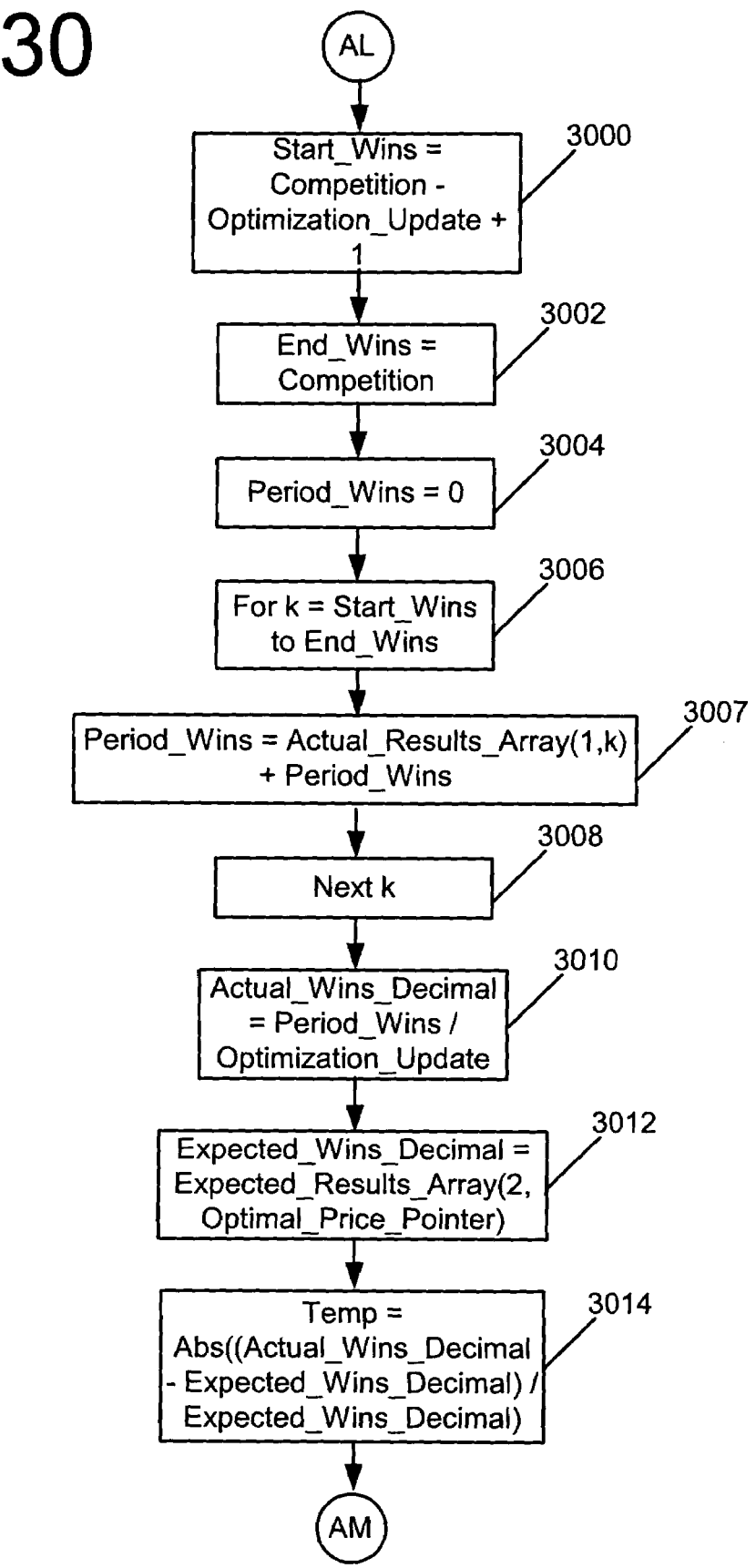
FIG. 30 is a flow chart illustrating the calculation of Actual Wins for a given period.

Step 2912 begins the flow diagram of the Optimization Update Engine 128 shown in FIG. 1. The decision whether to re-optimize pricing is based on a pre-determined number of offer opportunities and an evaluation of whether the percentage difference between the actual and expected win rates fall outside a predefined window. A determination of whether the arithmetic/logic expression (Competition MOD Optimization_Update AND Competition) 2912 is greater than zero. If the determination 2912 is not true, then the If 2912 statement is terminated in the End If 3216 statement. If the determination 2912 is true, then the program proceeds to step 3000 indicating the actual results of the optimization should be checked. FIG. 30 shows the continued flow diagram of the Optimization Update Engine referenced in FIG. 1. Start_Wins 3000 is set equal to Competition 3000 less Optimization_Update 3000 plus one. End_Wins 3002 is set equal to Competition 3002. Period_Wins 3004 is set to zero. A programming loop defined by the steps 3006 through 3008 is initiated by the For 3006 statement. k 3006 is set equal to Start_Wins 3006 and incremented in steps of one to a value equal to End_Wins 3006. Period_Wins 3007 is calculated by adding Actual_Results_Array(1,k) 3007+Period_Wins 3007. k is incremented by one and the programming loop defined by steps 3006 through 3008 repeated. Actual_Wins_Decimal 3010 is calculated by dividing the Period_Wins 3010 by Optimization_Update 3010. Expected_Wins_Decimal 3012 is set equal to Expected_Results_Array(2, Optimal_Price_Pointer) 3012. Temp 3014 is calculated by taking the absolute value of the difference between Actual_Wins_Decimal 3014 and Expected_Wins_Decimal 3014, and then dividing the difference by Expected_Wins_Decimal 3014.

Figure 31:
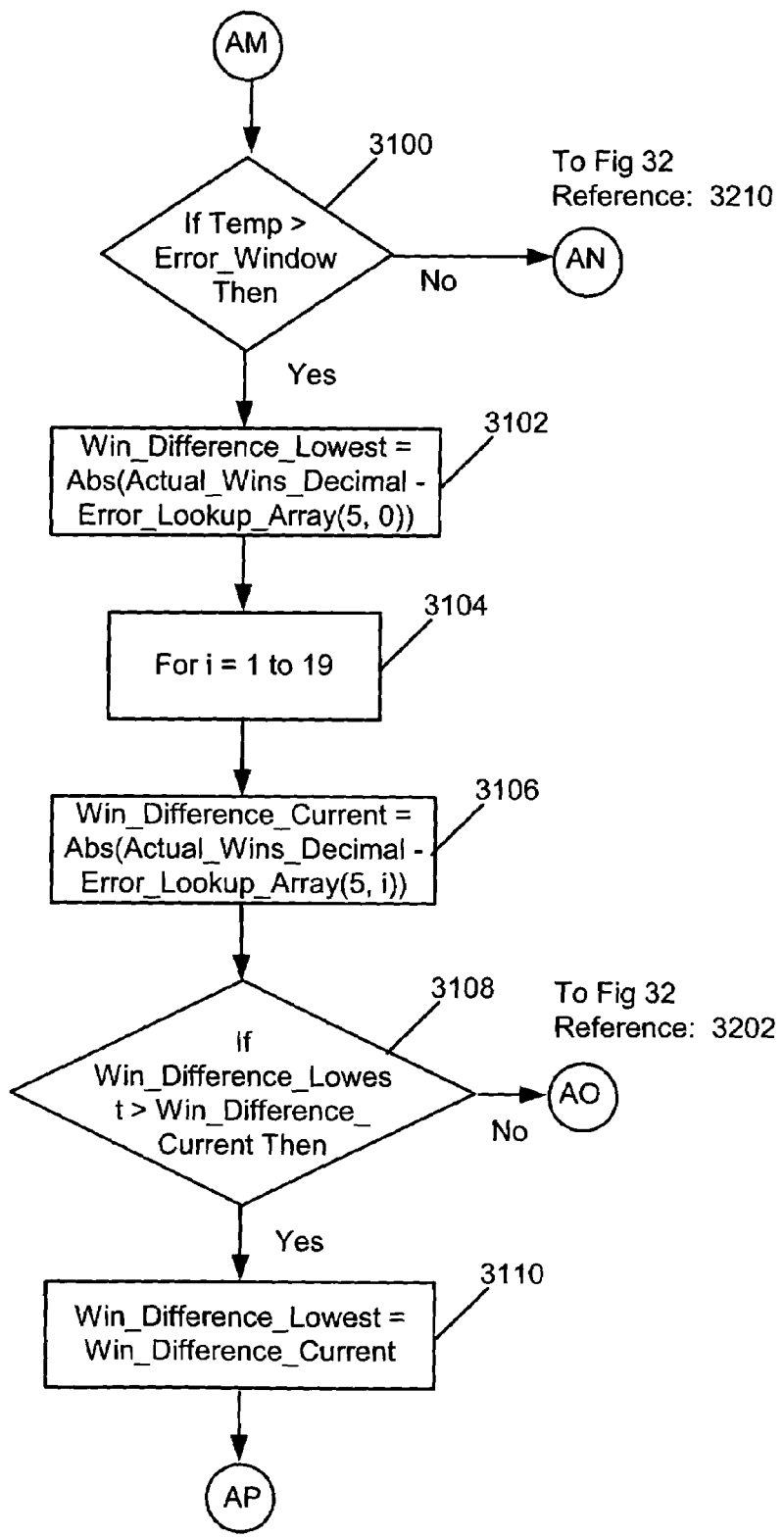
FIG. 31 is a flow chart illustrating the determination of whether Actual Wins is within a tolerable limit.

FIG. 31 shows the continued flow diagram of the Optimization Update Engine referenced in FIG. 1. FIG. 31 illustrates the determination of whether the actual results are within a tolerable limit. A determination of whether Temp 3100 is greater than Error_Window 3100 is made. If the determination 3100 is not true, then the If 3100 statement is terminated in an End If 3210 statement. If the determination 3100 is true, then Win_Difference_Current 3102 is calculated by taking the absolute value of the difference between the Actual_Wins_Decimal 3102 and the Error_Lookup_Array(5,0) 3102. A programming loop defined by steps 3104 and 3204 is initiated with the For 3104 statement. i is incremented from one to 19 in steps of one. Win_Difference_Current 3106 is calculated by taking the absolute value of the difference between the Actual_Wins_Decimal and Error_Lookup_Array(5,i) 3106. A determination of whether Win_Difference_Lowest 3108 is greater than Win_Difference_Current 3108 is made. If the determination 3108 is not true, then the If 3108 statement is terminated in and End If 3202 statement. If the determination 3110 is true, then Win_Difference_Lowest is set equal to Win_Difference_Current 3110.

Figure 32:
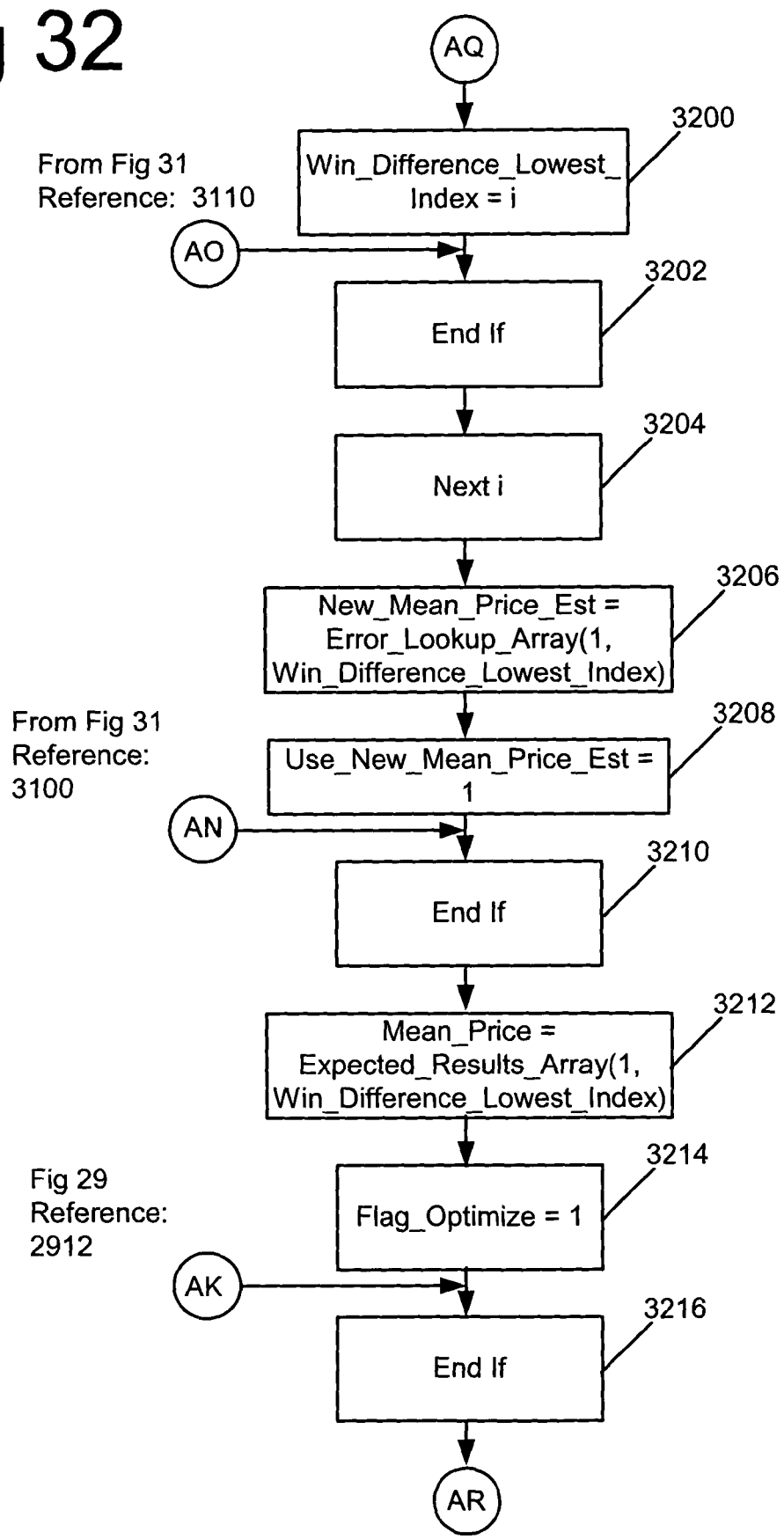
FIG. 32 is a flow chart illustrating the selection of a New Mean Price.

FIG. 32 shows the continued flow diagram of the Optimization Update Engine referenced in FIG. 1. FIG. 32 illustrates the selection of a new mean price. Win_Difference_Lowest_Index 3200 is set equal to i. i is incremented by one and the programming loop defined by steps 3104 through 3204 is repeated New_Mean_Price_Est 3206 is set equal to Error_Lookup_Array(1, Win_Difference_Lowest_Index) 3206. The variable Use_New_Mean_Price_Est is set equal to one. Mean_Price 3212 is set equal to Expected_Results_Array(1, Win_Difference_Lowest_Index) 3212. The variable Flag_Optimize 3214 is set equal to one.

The incorporation of a method to rapidly detect when to update the price optimization is a significant advancement over prior art. Since prior art does not include metrics related to Offer Opportunities and Probability of Win, knowing when to conduct an update of price optimization was a matter of qualitative professional judgment as opposed to quantitative determination based on statistical principles of sampling theory.

In addition to detecting when an update of price optimization is needed, using the actual win rate as a way of re-optimizing the price is a significant advancement over prior art. Unlike prior art that requires reformation of the demand curve by selling the subject good or service at various prices, this embodiment uses the actual win rate and current price to eliminate the need for test selling. Rather, the actual win rate is used to reformulate the Frequency Distribution, recalculate the Probability of Win, determine the new Expected Results, and select the optimal price.

The combination of detecting when to update the optimization and the method of re-optimizing allows this embodiment to produce more accurate price optimizations one to two orders of magnitude faster than prior art.

Figure 33:
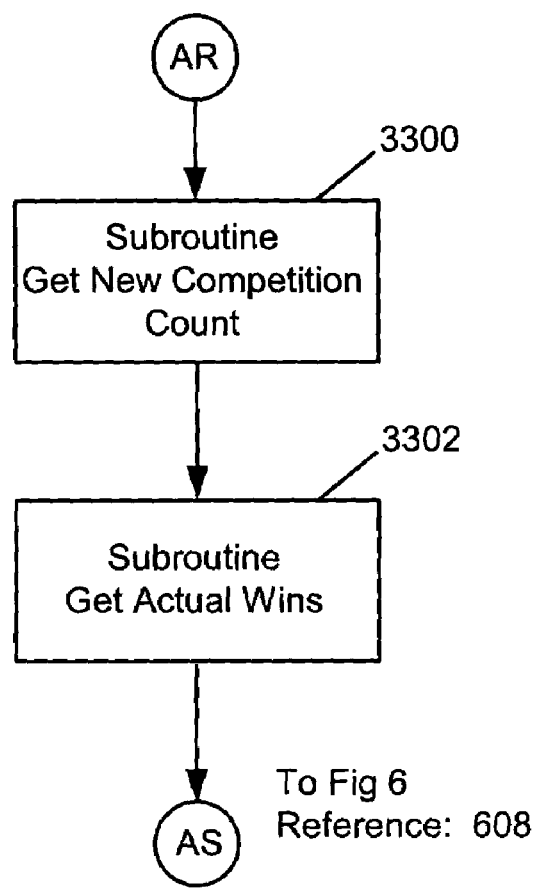
FIG. 33 is a flow chart illustrating subroutines that extract Competition Counts and Actual Wins from legacy systems.

FIG. 33 illustrates the flow diagram that represents the Interface to Legacy Systems 124 shown in FIG. 1. The subroutine Get_New_Competition_Count 3300 extracts the number of competition for a given time period from the Legacy System(s) 126 and assigns the value to the variable Competition 3300. The subroutine Get_Actual_Wins 3302 extracts the number of sales for a given time period from the Legacy Systems(s) 126 and assigns it to the variable Actual_Wins 3302. The program then loops back to step 608.

The present embodiment provides a superior computer implemented method for continuously pricing goods and services so that certain business objectives are met. The technique overcomes the three principal challenges of the prior art. In addition, the present embodiment adds a significant enhancement that mitigates the uncertainty in implicit assumptions associated with the prior art.

The method begins by a user creating an estimated Frequency vs. Price distribution curve for the subject market. This curve represents the user's estimate of the frequency of competitor's offers at each price for similar goods and services.

The Frequency vs. Price distribution curve is converted to a Probability of Win vs. Price curve by integrating the area under the Frequency vs. Price distribution curve. The Probability of Win vs. Price curve is adjusted based on the number of competitors. Using the Probability of Win vs. Price curve, the number of units sold can be predicted based on a number of offer opportunities. Offer opportunities are the instances in a given time period that a supplier has to sell their goods or services. How offer opportunities are quantified may differ from industry-to-industry. For example, an industrial distributor may sell their goods through a request-for-quote/bid model. Offer opportunities in this instance consist of the number of bids the distributor submitted to potential customers in a given time period. Another example is a grocer. If the grocer wanted to understand the market's responsiveness to a particular type of cereal, the offer opportunities could be defined as the number of overall sales for all cereals.

As with the prior art, using the understanding of the relationship between quantity and price, an income statement, as well as additional metrics, can be constructed for each price through the following steps; a) Calculation of revenue by multiplying the price and quantity, b) Determination of the cost-of-goods by multiply the quantity and unit cost at that quantity, c) Calculation of gross profit by subtracting the cost-of-goods from the revenue, d) Determining the sales and general administration costs, e) Calculating the earnings before income tax by subtracting the sales and general administration costs from the gross profit, f) Calculation of market share by dividing the quantity by the total quantity sold by all suppliers, and e) Calculating factor utilization by dividing the units sold by the capacity of the factory for that product. Once the income statement and additional metrics are calculated for each prize, the optimum price can be selected to satisfy one or more business objects.

Market shifts due to changes in demand or shifts in one or more competitor's pricing are detected by comparing the expected probability of win verse the actual win rate at a given price. If the actual and expected win rates differ outside of a predefined window of acceptability, then an optimization update is initiated.

If an optimization is merited, the method uses the difference between the expected and actual win rate to determine how the frequency distribution curve should be altered. The probability of win curve is then recalculated, the process of computing an income statement for each price repeated, and the appropriate price selected based on the optimization.

The creation of the Frequency Distribution and Probability of Win curves solves the four challenges of the prior art and substantially mitigates the uncertainty of implicit assumptions in the following ways:

a) Provides a complete representation of a market's responsiveness to pricing rather than the limited view provided by the supplier's historical sales orders.

b) Overcomes the absence of statistically relevant data that hinders the rendition of a demand curve.

c) Ensures market relevancy by using an expert's view of the market rather than relying on historical sales order data that may not be relevant in predicting the market's responsiveness.

d) Mitigates the weight on the assumption that the market remains the same by creating a metric called offer opportunities through which sales opportunities may be gauged.

The fifth and sixth challenges of prior art, rapidly determining when an optimization is needed and updating the optimization are solved in the following ways:

a) Provides a method for rapid detection of when optimization is no longer relevant based on the difference between actual and expected win rate.

b) A method for rapidly updating the optimization by using the difference between actual and expected win rate in determining a new more representative Frequency Distribution curve for the subject market.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any one of the above-described exemplary embodiments, but should be defined only in accordance with the following claims and their equivalents.

What is claimed is:

1. A computer program product embodied on a computer readable medium for utilizing feedback in generating an optimal price, comprising:

computer code for generating an optimal price, utilizing a processor of a computer system, wherein the optimal price is generated by receiving a plurality of prices associated with a price-frequency mathematical distribution, a number of competitors, a business objective, and a cost associated with a good or service, via an input device coupled to the processor of the computer system; and calculating the optimal price based on the prices, number of competitors, business objective, and cost associated with the good or service, utilizing the processor of the computer system;

computer code for identifying an expected result of utilizing the optimal price;

computer code for reacting by adjusting the price-frequency mathematical distribution based on a difference between the expected result and an actual result, utilizing the processor of the computer system; and computer code for outputting the optimal price;

wherein the computer code is executed on the processor of the computer system for aiding in the achievement of the business objective.

2. A system for utilizing feedback in generating an optimal price, comprising:

a processor for generating an optimal price, identifying an expected result of utilizing the optimal price, wherein the optimal price is generated by receiving a plurality of prices associated with a price-frequency mathematical distribution, a number of competitors, a business objective, and a cost associated with a good or service, via an input device coupled to the processor; and calculating the optimal price based on the prices, number of competitors, business objective, and cost associated with the good or service; and an output device coupled to the processor, the output device outputting the optimal price;

wherein the computer code is executed utilizing the processor for aiding in the achievement of the business objective.

3. A system as recited in claim 2, wherein the price-frequency mathematical distribution is used to estimate a set of competitor prices.

4. A system as described in claim 2, wherein the price-frequency mathematical distribution is estimated using the set of competitor prices.

5. A system as described in claim 2, wherein the price-frequency mathematical distribution is converted to an expected probability of a customer purchase based on the number of competitors.

6. A system as recited in claim 2, wherein the price-frequency mathematical distribution is converted to a table of prices with a frequency of a price within the table corresponding to the price-frequency mathematical distribution.

7. A system as recited in claim 6, wherein each price, probability of a customer purchase, and cost-per-unit are used to form a income/operational statement for each member of a plurality of prices.

8. A system as recited in claim 7, wherein each income/operational statement is comprised of financial and operational terms including revenue, cost-of-goods, gross profit, EBIT, factory utilization, and market penetration.

9. A system as recited in claim 8, wherein a set of the partial income/operational statements are stored within a table.

10. A system as recited in claim 9, wherein a maximum revenue value, a maximum profit value, a plurality of factory utilization values, and the market penetration value corresponding to a market penetration goal are identified along with corresponding prices.

11. A computer-implemented method for utilizing feedback in generating an optimal price, comprising:

generating an optimal price, utilizing a processor of a computer system, wherein the optimal price is generated by receiving a plurality of prices associated with a price-frequency mathematical distribution, a number of competitors, a business objective, and a cost associated with a good or service, via an input device coupled to the processor of the computer system; and calculating the optimal price based on the prices, number of competitors, business objective, and cost associated with the good or service, utilizing the processor of the computer system;

identifying an expected result of utilizing the optimal price, utilizing the processor of the computer system;

reacting by adjusting the price-frequency mathematical distribution based on a difference between the expected result and an actual result, utilizing the processor of the computer system; and outputting the optimal price for aiding in achieving the business objective, utilizing an output device coupled to the processor of the computer system.

12. The method as recited in claim 11, wherein the result includes units sold.

13. The method as recited in claim 11, wherein the result includes a revenue term.

14. The method as recited in claim 11, wherein the result includes a gross profit.

15. The method as recited in claim 11, where in the result includes an expected win-rate calculated based on the price-frequency mathematical distribution and the number of competitors.

16. The method as recited in claim 11, wherein the result includes earnings before income tax (EBIT) for each price.

17. The method as recited in claim 11, and further comprising: computing a frequency distribution of a plurality of prices.

18. The method as recited in claim 17, and further comprising: calculating at least one result selected from the group consisting of units sold, revenue, a gross profit, a factory utilization, a market penetration, and earnings before income tax (EBIT) for each price, wherein the at least one result is stored in a table.

19. The method as recited in claim 18, and further comprising: searching the table for the optimum price that optimizes a user-selected business objective.

20. The method as recited in claim 19, wherein the business objective is selected from the group consisting of maximizing revenue for a good or service, maximizing gross profit for the good or service, maximizing factory utilization for the good or service, achieving a desired market share for the good or service, and maximizing earnings before income tax (EBIT) for the good or service.

21. The method as recited in claim 11, and further comprising: if it is determined that the optimization is required, identifying a new price value by re-computing the price-frequency mathematical distribution so as to minimize the difference between the actual and expected results, wherein the operations are repeated based on the new price value.

22. The method as recited in claim 11, wherein the method is carried out utilizing a frequency distribution engine, a probability of win engine, an expected results engine, an optimization update engine, and a legacy system interface.

23. A method as recited in claim 11, wherein a graphical user interface is included.

24. A method as recited in claim 23, wherein the graphical user interface is adapted for inputting the business objective.

25. A method as recited in claim 23, wherein the graphical user interface is included for inputting the plurality of prices and the number of competitors.

26. The method as described in claim 11, wherein the expected probability of a customer purchase is determined for the optimal price.

27. A method as recited in claim 11, wherein the actual probability of customer purchases is calculated by dividing the number of customer purchase orders by the number of customer exposures.

28. A method as recited in claim 11, wherein an actual probability of customer purchase is compared with an expected probability of customer purchase.

29. A method as recited in claim 28, wherein the difference between an actual and an expected probability of customer purchase is calculated.

30. A method as recited in claim 29, wherein the updated price-frequency mathematical distribution is calculated so as to minimize a difference between an actual and expected probability of customer purchase.

31. A method as recited in claim 30, wherein the updated optimal price is calculated based on an updated price-frequency mathematical distribution.

32. The method as described in claim 31, wherein an actual win-rate is calculated by dividing the sum of wins by a value for competition.

33. The method as recited in claim 11, wherein the results includes factory utilization.

34. The method as recited in claim 11, wherein the result includes market penetration.

* * * * *

UNITED STATES PATENT AND TRADEMARK OFFICE
CERTIFICATE OF CORRECTION

PATENT NO. : 7,257,561 B1
APPLICATION NO. : 10/644944
DATED : August 14, 2007
INVENTOR(S) : Abe It is certified that error appears in the above-identified patent and that said Letters Patent is hereby corrected as shown below:

In the claims:
Col. 20, line 15, please replace "the" with --a--.

Signed and Sealed this
Twenty-fourth Day of May, 2011

David J. Kappos
*Director of the United States Patent and Trademark Office*